(12) United States Patent
Sasaki et al.

(10) Patent No.: US 8,342,567 B2
(45) Date of Patent: Jan. 1, 2013

(54) AIRBAG-EQUIPPED STEERING WHEEL DEVICE

(75) Inventors: Kenji Sasaki, Aichi-ken (JP); Osamu Hirose, Aichi-ken (JP); Norio Suzuki, Aichi-ken (JP); Hitoshi Iida, Aichi-ken (JP); Yoshiteru Banno, Aichi-ken (JP); Tomoki Okada, Aichi-ken (JP); Masakazu Asano, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/419,524

(22) Filed: Mar. 14, 2012

(65) Prior Publication Data

US 2012/0169032 A1    Jul. 5, 2012

Related U.S. Application Data

(63) Continuation of application No. 12/656,998, filed on Feb. 23, 2010, now abandoned.

(30) Foreign Application Priority Data

Feb. 27, 2009  (JP) ................... 2009-046327
Aug. 28, 2009  (JP) ................... 2009-198569

(51) Int. Cl.
*B60R 21/203* (2006.01)
(52) U.S. Cl. ................. 280/728.2; 200/61.55; 280/731
(58) Field of Classification Search .... 200/61.54–61.57; 280/728.2, 731
See application file for complete search history.

(56) References Cited

U.S. PATENT DOCUMENTS

| 5,584,501 | A | 12/1996 | Walters |
| 5,775,725 | A | 7/1998 | Hodac et al. |
| 6,040,542 | A | 3/2000 | Wolfe |
| 6,082,758 | A | 7/2000 | Schenck |
| 6,457,379 | B1 | 10/2002 | Mirone |
| 6,508,485 | B2 * | 1/2003 | Kikuta et al. .............. 280/728.2 |

(Continued)

FOREIGN PATENT DOCUMENTS

JP    A-H10-500922    1/1998

(Continued)

OTHER PUBLICATIONS

Notice of Allowance dated Jun. 11, 2012 in corresponding JP Application No. 2009-046327.

*Primary Examiner* — Faye M Fleming
*Assistant Examiner* — Laura Freedman
(74) *Attorney, Agent, or Firm* — Posz Law Group, PLC

(57) ABSTRACT

In an airbag-equipped steering wheel, a plurality of horn switch mechanisms assembled to a bag holder each have a securing pin, which is inserted into a corresponding one of through holes formed in a metal core. A clip is engaged with a locking groove of each securing pin, so that each horn switch mechanism is fastened to the metal core. The through holes include one or more normal through holes that restrict inclination of the corresponding securing pins, and a special through hole that has an inclination permitting portion. The inclination permitting portion permits the corresponding securing pin to be inclined about the corresponding clip 13 serving as a fulcrum. In the special through hole, the securing pin is permitted to be inclined about the clip serving as a fulcrum only when the clips are disengaged from the securing pin in all the normal through holes.

5 Claims, 16 Drawing Sheets

U.S. PATENT DOCUMENTS

| | | | |
|---|---|---|---|
| 6,600,114 B2 * | 7/2003 | Kikuta et al. | 200/61.55 |
| 6,688,638 B2 | 2/2004 | Schutz | |
| 6,874,808 B2 | 4/2005 | Marath et al. | |
| 6,942,247 B2 | 9/2005 | Simpson | |
| 6,974,919 B2 | 12/2005 | Mori et al. | |
| 7,464,959 B2 | 12/2008 | Pillsbury et al. | |
| 7,547,042 B2 | 6/2009 | Chapelain et al. | |
| 2006/0197323 A1 * | 9/2006 | Pillsbury et al. | 280/731 |
| 2010/0066062 A1 | 3/2010 | Suzuki et al. | |

FOREIGN PATENT DOCUMENTS

| | | |
|---|---|---|
| JP | A-2002-002433 | 1/2002 |
| JP | A-2002-012115 | 1/2002 |
| JP | A-2004-268899 | 9/2004 |
| JP | 2004-284414 | 10/2004 |
| JP | A-2005-531464 | 10/2005 |
| JP | A-2006-294379 | 10/2006 |
| JP | A-2006-351313 | 12/2006 |

* cited by examiner

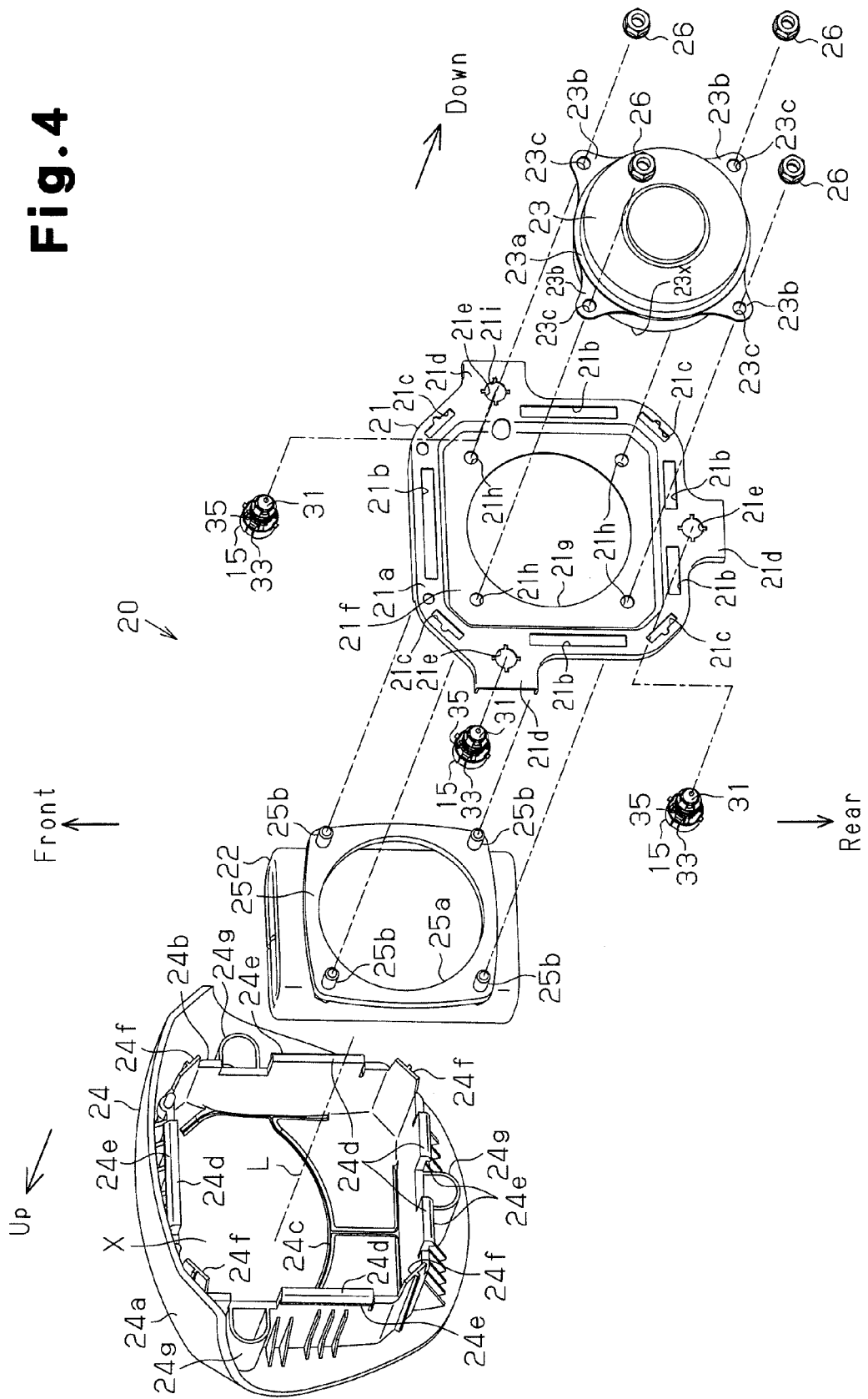

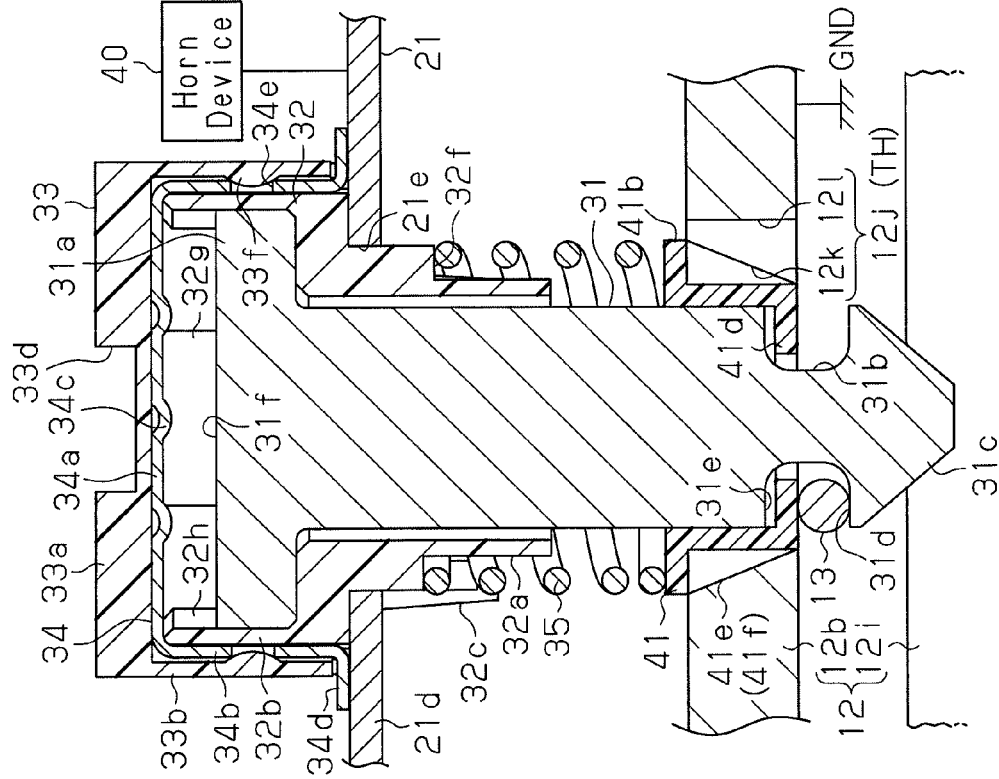

US 8,342,567 B2

AIRBAG-EQUIPPED STEERING WHEEL DEVICE

This application is a continuation of U.S. application Ser. No. 12/656,998 filed on Feb. 23, 2010, allowed on Jan. 24, 2012, which is based on and claims priority to Japanese Patent Applications No. 2009-046327 filed on Feb. 27, 2009 and No. 2009-198569 filed on Aug. 28, 2009, the disclosure of which are incorporated herein by reference.

BACKGROUND OF THE INVENTION

The present invention relates to a steering wheel having an airbag device for protecting an occupant from an impact applied from the front of a vehicle.

Japanese Laid-Open Patent Publication No. 2004-284414 discloses such a steering wheel, which includes a metal core, an airbag device, and a plurality of horn switch mechanisms. The metal core consists of the framework of the steering wheel. The airbag device is formed by assembling a pad portion, an airbag, and an inflator into a bag holder. The airbag device is arranged substantially above the metal core. The horn switch mechanisms are located between the airbag device and the metal core. When the airbag device is pressed down, the horn switch mechanisms activate the horn device.

When an impact is applied to a vehicle having the steering wheel from the front, the inflator of the airbag device discharges inflation gas to inflate the airbag. The inflation of the airbag breaks the pad portion. The airbag passes through the pad portion to be inflated between the steering wheel and the driver. The inflated airbag reduces the impact received by the driver.

The horn switch mechanisms are arranged between the bag holder and a metal horn plate attached to the metal core. Each horn switch mechanism has fixed members, movable members, urging members (load springs for the horn), and bolts. The fixed members include fixed contact portions and resin fixed supports supporting the fixed contact portions, and are supported by the horn plate. The movable members include movable contact portions and resin movable supports supporting the movable contact portions, and are supported by the bag holder. The load springs for the horn are located between the fixed members and the movable members, and urge the movable contacts upward away from the fixed contacts. The bolts allow the movable members to move substantially downward, thereby separating the movable contacts and the fixed contacts from each other.

When the driver presses down the airbag device of the steering wheel, the airbag device is moved toward the horn plate against the urging force of the load springs for the horn, together with the movable members and the bolts of the horn switch mechanisms. This causes the movable contact portions to contact the fixed contact portions, activating the horn device. In the airbag-equipped steering wheel disclosed in Japanese Laid-Open Patent Publication No. 2004-284414, the airbag device activates the horn device. This complicates the structure and increases the number of components.

Accordingly, the following configuration may be employed. As shown in FIG. 24, a metal core 49 includes a core body 52 and a holding portion 57 located substantially above the core body 52. The holding portion 57 has a through hole 55. An elastic member 56 is provided between the holding portion 57 and the core body 52 and in the vicinity of the through hole 55. A bag holder 51 is electrically connected to a horn device 62.

Horn switch mechanisms 50 each include a metal support member 58, an urging member 53, and a movable contact portion 54. The support member 58, the urging member 53, and the movable contact portion 54 are unitized before being installed in the bag holder 51. The support member 58 supports the bag holder 51 such that the bag holder 51 can move substantially in the up-down direction. The upper end face of the support member 58 forms a fixed contact portion 61. A locking groove 63 is formed in the lower end of the support member 58. The urging member 53 urges the bag holder 51 substantially upward and away from the metal core 49. The movable contact portion 54 moves together with the bag holder 51. This causes the movable contact portion 54 to contact the fixed contact portion 61, activating the horn device 62. The support member 58 attached to the bag holder 51 is inserted into the through hole 55 of the holding portion 57, and the elastic member 56 is engaged with the locking groove 63, so that the horn switch mechanism 50 is fastened to the holding portion 57 of the metal core 49.

In a normal state, in which the airbag device is not pressed down, the movable contact portion 54 is separated substantially upward from the fixed contact portion 61 of the support member 58. At this time, the contact portions 54, 61 are in a non-conductive state, and the horn device 62 does not operate. In contrast, when the airbag device is pressed down, the movable contact portion 54 is moved substantially downward together with the bag holder 51. This causes the movable contact portion 54 to contact the fixed contact portion 61, activating the horn device 62.

The support member 58 is locked to the metal core 49 and supports the bag holder 51 such that the bag holder 51 is movable in up-down direction relative to the metal core 49. The support member 58 also functions as the fixed contact portion 61. Therefore, the horn plate disclosed in Japanese Laid-Open Patent Publication No. 2004-284414 can be omitted. This reduces the number of the components and simplifies the structure.

In the above illustrated structure, the airbag-equipped steering wheel is attached to the metal core 49. Thus, when multiple horn switch mechanisms 50 installed in the bag holder 51 are fastened to the metal core 49, the support member 58 of each horn switch mechanism 50 is inserted into the through hole 55 of the holding portion 57 against the urging force of the elastic member 56. The insertion of the support member 58 into the through hole 55 deforms the elastic member 56 toward the outside of the support member 58. When the support member 58 is inserted to a position where the locking groove 63 is aligned with the elastic member 56, the elastic member 56 enters the locking groove 63 due to its own elastic force, and the support member 58 is locked to the metal core 49. This procedure is performed for each horn switch mechanism 50. When removing the airbag-equipped steering wheel from the metal core 49, the elastic member 56 is deformed with a tool, thereby moving the support member 58 away from the locking groove 63. When the elastic member 56 is removed from the locking groove 63, the spring force of the urging member 53 urges the support member 58 substantially upward so that the support member 58 comes off the through hole 55.

Japanese Laid-Open Patent Publication No. 2002-2433 discloses a configuration in which a single elastic wire is used for multiple through holes 55 to form the elastic member 56. According to this method, by moving the elastic wire to a disengaging position, the elastic wire, which is engaged with multiple support members 58, is disengaged at once. However, this method requires that the entire elastic wire be moved by an operation at one position. This complicates the structures for engaging and disengaging of the elastic wire. Also, the size of the elastic member 56 needs to be relatively large, and a space for allowing the elastic member 56 to move is required. On the other hand, as the functionality of steering wheels has been improved, it has become difficult to provide a sufficient space in the steering wheel.

Japanese Laid-Open Patent Publication No. 2004-268899 discloses a method for arranging an elastic member 56 in each of a plurality of through holes 55. Although this method reduces the space for the elastic member 56, the number of steps for removing the elastic members 56 from the support members 58 is increased in accordance with the number of the through holes 55. This makes the removal of the elastic members 56 troublesome.

SUMMARY OF THE INVENTION

Accordingly, it is an objective of the present invention to provide an airbag-equipped steering wheel that reduces the size of a space in which an elastic member is arranged and operates, and allows a plurality of horn switch mechanisms fastened to a metal core to be easily unfastened.

To achieve the foregoing objective and in accordance with one aspect of the present invention, an airbag-equipped steering wheel including a metal core, an airbag device, a plurality of elastic members, and a plurality of horn switch mechanisms is provided. The metal core forms a framework of the steering wheel and has a plurality of through holes. The airbag device is located at a position higher than the through holes and has a bag holder, a pad portion assembled to the bag holder, an airbag, and an inflator. Each of the elastic members is located substantially below and in the vicinity of one of the through holes. The horn switch mechanisms are located between the airbag device and the metal core. Each horn switch mechanism corresponds to one of the through holes. When the airbag device is pressed down, any of the horn switch mechanisms activates a horn device. Each horn switch mechanism includes a support member that supports the bag holder so as to allow the bag holder to move substantially in an up-down direction. A recess is formed at the lower end of each support member. The corresponding elastic member is engaged with the recess. The horn switch mechanisms are fastened to the metal core by inserting the support members attached to the bag holder into the through holes and engaging the elastic members with the recesses of the support members. The through holes include one or more normal through holes each restricting inclination of the corresponding support member and a special through hole having an inclination permitting portion. The inclination permitting portion permits the corresponding support member to be inclined about the corresponding elastic member serving as a fulcrum. The inclination permitting portion permits the inclination of the corresponding support member about the corresponding elastic member serving as a fulcrum only when the elastic members are disengaged from the support members in all the normal through holes.

BRIEF DESCRIPTION OF THE DRAWINGS

FIG. 4 is an exploded perspective view showing the airbag device;

FIG. 12 is a cross-sectional view illustrating a state in which a securing pin is inserted into a special through hole;

FIG. 13 is a cross-sectional view illustrating the horn switch mechanism before being attached to the normal through hole of the metal core;

DETAILED DESCRIPTION OF THE PREFERRED EMBODIMENTS

An airbag-equipped steering wheel according to one embodiment of the present invention will now be described with reference to FIGS. 1 to 18. The steering wheel is used in a vehicle. Hereinafter, the advancing direction of the vehicle will be referred to as the front of the vehicle, and the widthwise direction of the advancing vehicle will be referred to as the left-right direction of the vehicle. The steering wheel includes a steering wheel main body, an airbag device, and horn switch mechanisms.

Figure 1:
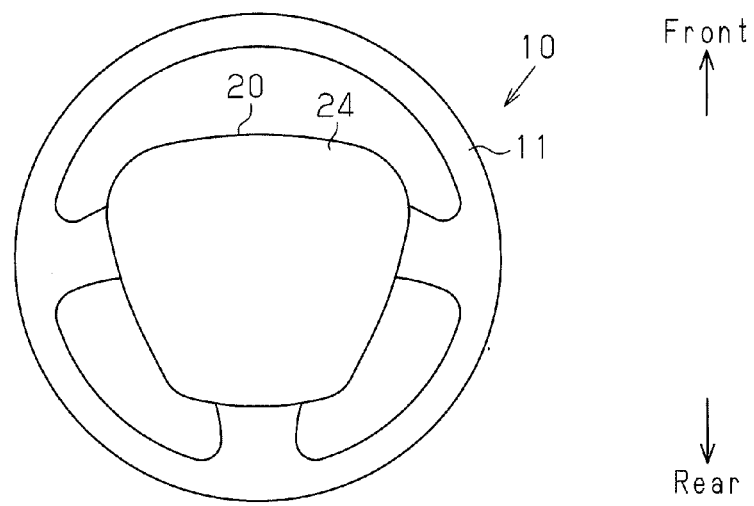
FIG. 1 is a front view illustrating an airbag-equipped steering wheel according to one embodiment of the present invention.
Figure 2:
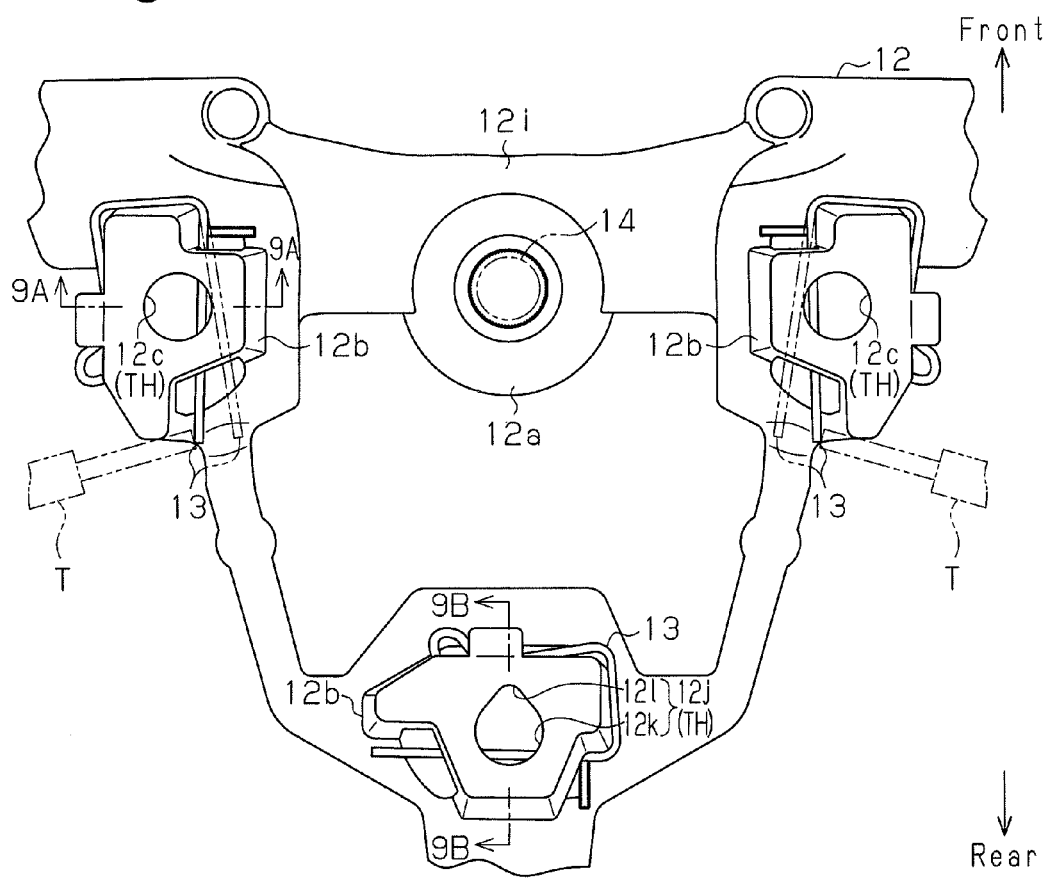
FIG. 2 is a front view showing a portion of the metal core of the steering wheel body.

As shown in FIGS. 1 and 2, a steering wheel 10 includes a steering wheel main body 11, which is held by the driver. An airbag device (airbag module) 20 is installed at a center of the steering wheel main body 11. The steering wheel main body 11 includes a metal core 12, which is formed by the framework of the steering wheel 10. The metal core 12 is made of iron, aluminum, magnesium, or an alloy thereof. The metal core 12 is fixed to a steering shaft 14 with a boss portion 12a.

A plurality of holding portions 12b are provided about the boss portion 12a. To distinguish the holding portions 12b and the remainder from each other, the latter is referred to a core main body 12i. The holding portions 12b are provided on the left, on the right, and behind the boss portion 12a. Each holding portion 12b includes a through hole TH, in which a securing pin 31 of the horn switch mechanism 15 is inserted. The through holes TH include normal through holes 12c and a special through hole 12j.

Figure 9A:
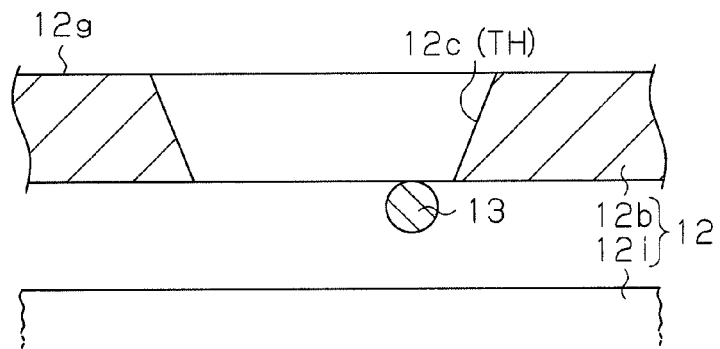
FIG. 9A is a cross-sectional view taken along line 9A-9A in FIG. 2.
Figure 9B:
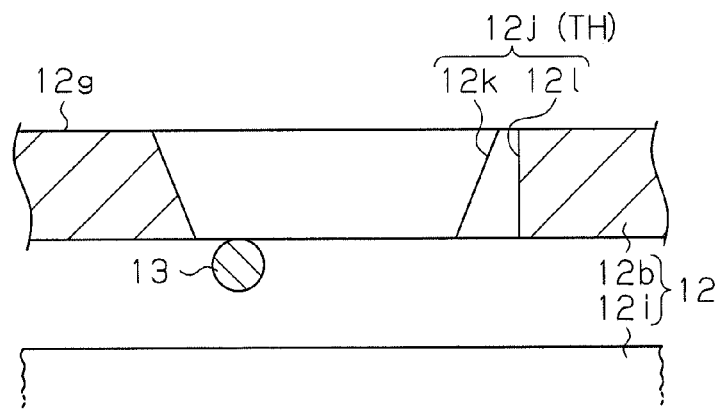
FIG. 9B is a cross-sectional view taken along line 9B-9B in FIG. 2.

As shown in FIGS. 2, 9A, and 9B, an elastic member, which is a clip 13, is provided between each holding portion 12b and the core main body 12i. Each clip 13 is formed by bending a metal wire such as spring steel. Each clip 13 is arranged between the corresponding holding portion 12b and the core main body 12i while being elastically deformed. An end of the clip 13 contacts at least one of the holding portion 12b and the core main body 12i. Each clip 13 locks the securing pin 31 of the corresponding horn switch mechanism 15 to the metal core 12 such that securing pin 31 and the metal core 12 are in a conductive state. A part of the clip 13 is located substantially below the through hole TH.

One clip 13 is arranged at each through hole TH. Therefore, a space for arranging the clip 13 and a space for allowing the clip 13 to move is only needed in the vicinity of each through hole TH. In contrast, in the case of Patent Document 2, in which the clips 13 are formed by a common single elastic wire, a space for arranging the clips 13 and a space for allowing the clips 13 to move are needed not only in the vicinity of each through hole TH, but also between each adjacent pair of the through holes TH. In this respect, the present embodiment is significantly different from the structure of Patent Document 2.

The three horn switch mechanisms 15 for activating the horn device 40 are each secured to the corresponding holding portion 12b of the metal core 12 by a snap-fit structure. The airbag device 20 is supported by the metal core 12 with the three horn switch mechanisms 15 in between. That is, in addition to the function as a horn switch, the horn switch mechanisms 15 have a function for supporting the airbag device 20.

The airbag device 20 and the horn switch mechanisms 15 will now be described.

<Airbag Device 20>

Figure 3:
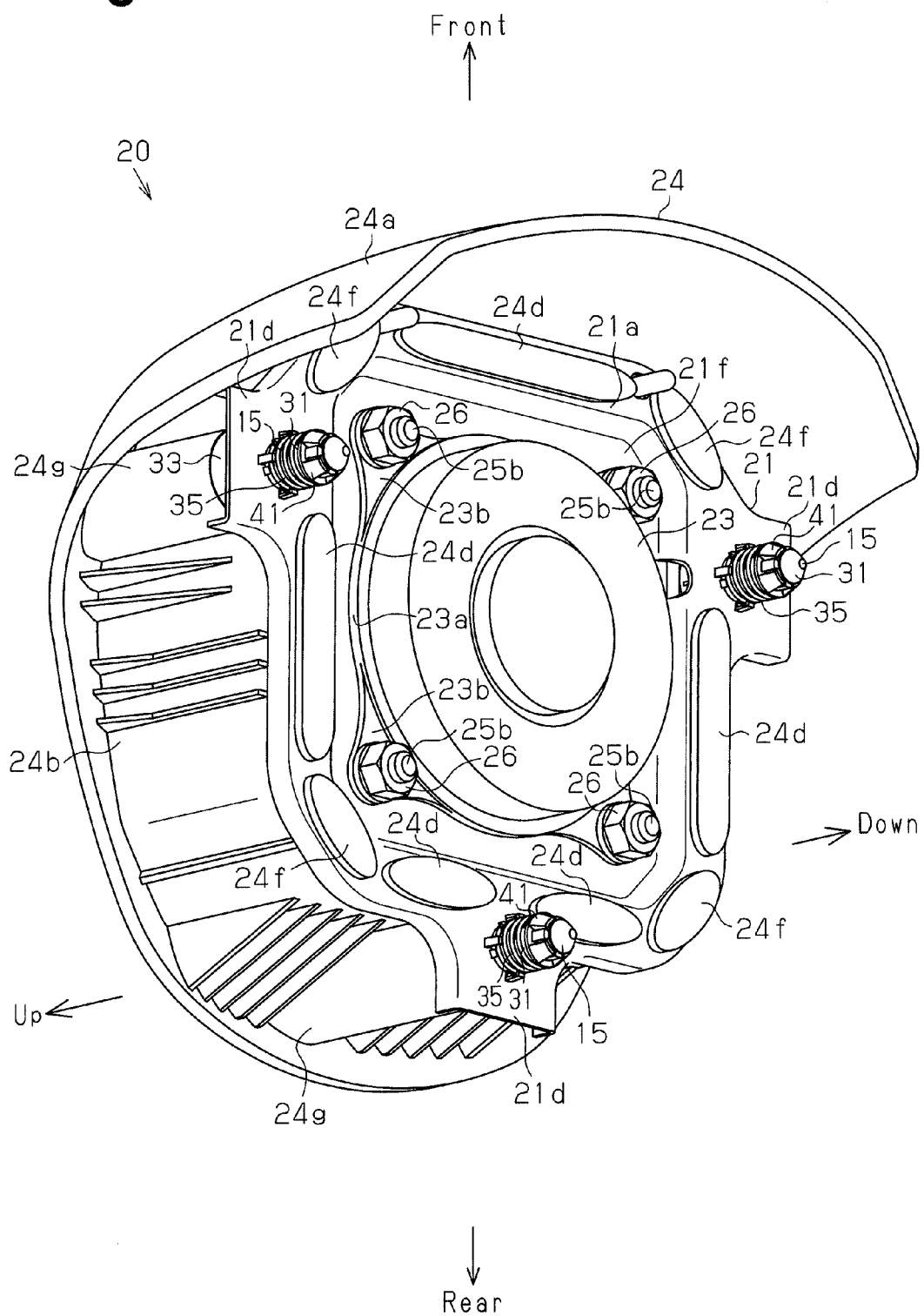
FIG. 3 is a rear perspective view showing the airbag device.

As shown in FIGS. 3 and 4, the airbag device 20 is formed by assembling a pad portion 24, an airbag 22, and an inflator 23 to a bag holder 21. The pad portion 24 has a resin outer cover 24a, which forms an ornamental surface, and a storing wall portion 24b, which is provided at the backside of (lower side) the outer cover 24a. A bag storing space X for storing the airbag 22 is formed between the inner surface of the outer cover 24a and the bag holder 21. A thin portion 24c, which is to be torn apart when the airbag 22 is inflated and deployed, is formed in a portion of the outer cover 24a defining the bag storing space X.

A plurality of locking claws 24d, each of which has a rectangular plate-like shape, are formed at an end of the storing wall portion 24b. Specifically, one of the locking claws 24d is arranged on the front wall, another one is arranged on the left wall, and another one is arranged on the right wall. The other two of the locking claws 24d are provided on the rear wall. A locking projection 24e projecting outward is formed at the lower end of each locking claw 24d. A rectangular plate-like swaging piece 24f is formed at each corner of the storing wall portion 24b.

Three switch support portions 24g for supporting the horn switch mechanisms 15 are formed in the pad portion 24. Each switch support portion 24g extends from the back surface of the outer cover 24a of the pad portion 24, and is formed integrally with the storing wall portion 24b. Each switch support portion 24g projects outward from the storing wall portion 24b. Each switch support portion 24g is hollow and has a U-shaped cross section. Each switch support portion 24g also functions as a rib that reinforces the storing wall portion 24b. The bag holder 21 is formed by pressing a metal plate to have a substantially rectangular shape. The bag holder 21 may be formed by die casting. A periphery fixing portion 21a, which has a substantially rectangular loop shape and is used for securing the pad portion 24, is formed in the peripheral portion of the bag holder 21. The periphery fixing portion 21a is substantially flat.

In the periphery fixing portion 21a, a locking hole 21b is formed at each of the positions corresponding to the locking claws 24d of the pad portion 24. Each locking hole 21b is a slit extending along the corresponding side of the bag holder 21. When inserting each locking claw 24d into the corresponding locking hole 21b, the claw 24d is flexed inward by the amount corresponding to the thickness of the locking projection 24e. The claw 24d returns to the original shape, so that the locking projection 24e is engaged with the periphery of the locking hole 21b. Each locking claw 24d, which is inserted into the locking hole 21b and located below the bag holder 21, is heated and crushed. The space between the locking claw 24d and the locking hole 21b is eliminated by heat swaging. Therefore, even if a great force is applied to the pad portion 24 when the airbag 22 is inflated and deployed, the locking claws 24d do not come off the locking holes 21b.

Figures 5A, 5B:
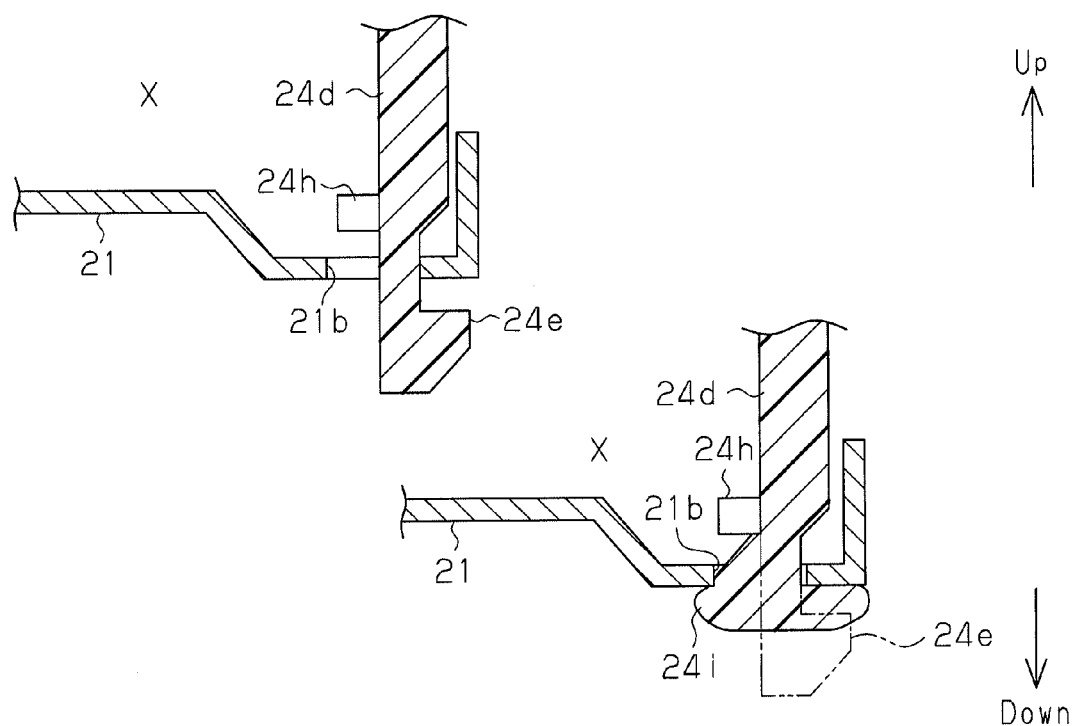
FIG. 5A is a partial cross-sectional view showing the relationship between a bag holder and a locking claw prior to heat swaging.
FIG. 5B is a partial cross-sectional view showing the relationship between the bag holder and the locking claw after heat swaging.

As shown in FIGS. 5A and 5B, a stopper 24h is formed on the inner surface of each locking claw 24d at a position above the locking hole 21b. The stopper 24h is located in the vicinity of the locking projection 24e, and is formed integrally with the locking claw 24d. Alternatively, the stopper 24h may be formed separately from the locking claw 24d and may be formed of a material different from that of the locking claw 24d. The stopper 24h prevents synthetic resin, which is melt by the heat of heat swaging, from flowing to a part above the bag holder 21 through the locking hole 21b. Accordingly, the deployment performance of the airbag 22 is not adversely influenced by adhesion of molten resin.

As shown in FIGS. 3 and 4, a swaging insertion hole 21c is formed at each of the four corners of the bag holder 21. Each swaging insertion hole 21c has a slit-like shape and receives the corresponding swaging piece 24f. Like the locking claws 24d, each swaging piece 24f, which is inserted into the swaging insertion hole 21c and located below the bag holder 21, is heated and crushed. The heat swaging of the locking claws 24d and the swaging pieces 24f fixes the pad portion 24 to the bag holder 21.

A substantially square seat portion 21f is formed at a position inside the periphery fixing portion 21a. A circular opening 21g is formed at the center of the seat portion 21f. An inflator 23 is received by and attached to the opening 21g of the seat portion 21f. Screw insertion holes 21h are formed at the four corners of the square seat portion 21f around the opening 21g.

The inflator 23 has a columnar main body. A flange 23a is formed on the outer circumferential surface of the inflator 23.

A plurality of attachment pieces 23b are formed in the flange 23a at equal angular intervals. Screw insertion holes 23c are formed in the respective attachment pieces 23b in correspondence with the screw insertion holes 21h of the bag holder 21. The inflator 23 has a gas outlet 23x for ejecting inflation gas at a portion substantially above the flange 23a. The inflator 23 is passed through the opening 21g of the bag holder 21 in such a manner that the gas outlet 23x projects into the bag storing space X. With the flange 23a held in contact with the periphery of the opening 21g, the inflator 23 is attached to the bag holder 21 together with a ring retainer 25.

The ring retainer 25 has an opening 25a the shape of which is the same as that of the opening 21g of the bag holder 21. The ring retainer 25 has attachment screws 25b, each of which is located at a position corresponding to one of the screw insertion holes 21h. The folded airbag 22 is attached to the opening 25a of the ring retainer 25. The portion of the ring retainer 25 other than the opening 25a is covered by the airbag 22. The attachment screws 25b for attaching the airbag 22 to the retainer 25 are inserted through the screw insertion holes 21h of the bag holder 21 and the screw insertion holes 23c of the inflator 23 from the bag storing space X. Further, nuts 26 are screwed onto the attachment screws 25b. This fixes the airbag 22 to the bag holder 21 with the ring retainer 25 and simultaneously fixes the inflator 23 to the bag holder 21.

Three attachment portions 21d, to which the horn switch mechanisms 15 are attached, are formed in the periphery fixing portion 21a. Two of the attachment portions 21d are arranged in the left side and the right side of the periphery fixing portion 21a near the front side, respectively. That is, each of these two attachment portions 21d is located between the locking hole 21b and swaging insertion hole 21c. The other one of the attachment portions 21d is located between the two locking holes 21b in the rear side of the periphery fixing portion 21a. These positions correspond to the switch support portions 24g of the pad 24, that is, to the boss portion 12a (see FIG. 2) of the metal core 12. The attachment portions 21d are substantially located in the same surface of the bag holder 21. An attachment hole 21e, to which one of the horn switch mechanisms 15 is attached, is formed in each attachment portion 21d. Each attachment hole 21e is circular like a tubular portion 32a of a movable attachment member 32. Each attachment hole 21e has recesses 21i, which extend radially outward. The recesses 21i are spaced apart at equal angular intervals (90°). On the same surface of the bag holder 21, the attachment holes 21e are provided at equal angular intervals about the steering shaft 14.

When the airbag device 20 is assembled, the bag holder 21 is arranged in such a manner that the surface of the bag holder 21 facing the pad 24 faces upward. Then, the horn switch mechanisms 15, the ring retainer 25, the airbag 22, and the pad portion 24 are assembled with the bag holder 21 from above. Then, the assembled body is reversed and then the inflator 23 is joined to the bag holder 21.

<Horn Switch Mechanism 15>

The steering wheel 10 has three horn switch mechanisms 15. The distance from the respective horn switch mechanism 15 to the center of the steering wheel 10 (the boss portion 12a) is preferably the same, so that a contact terminal 34 and an upper end face 31f of the securing pin 31 are reliably brought into contact to be in a conductive state.

Figure 6:
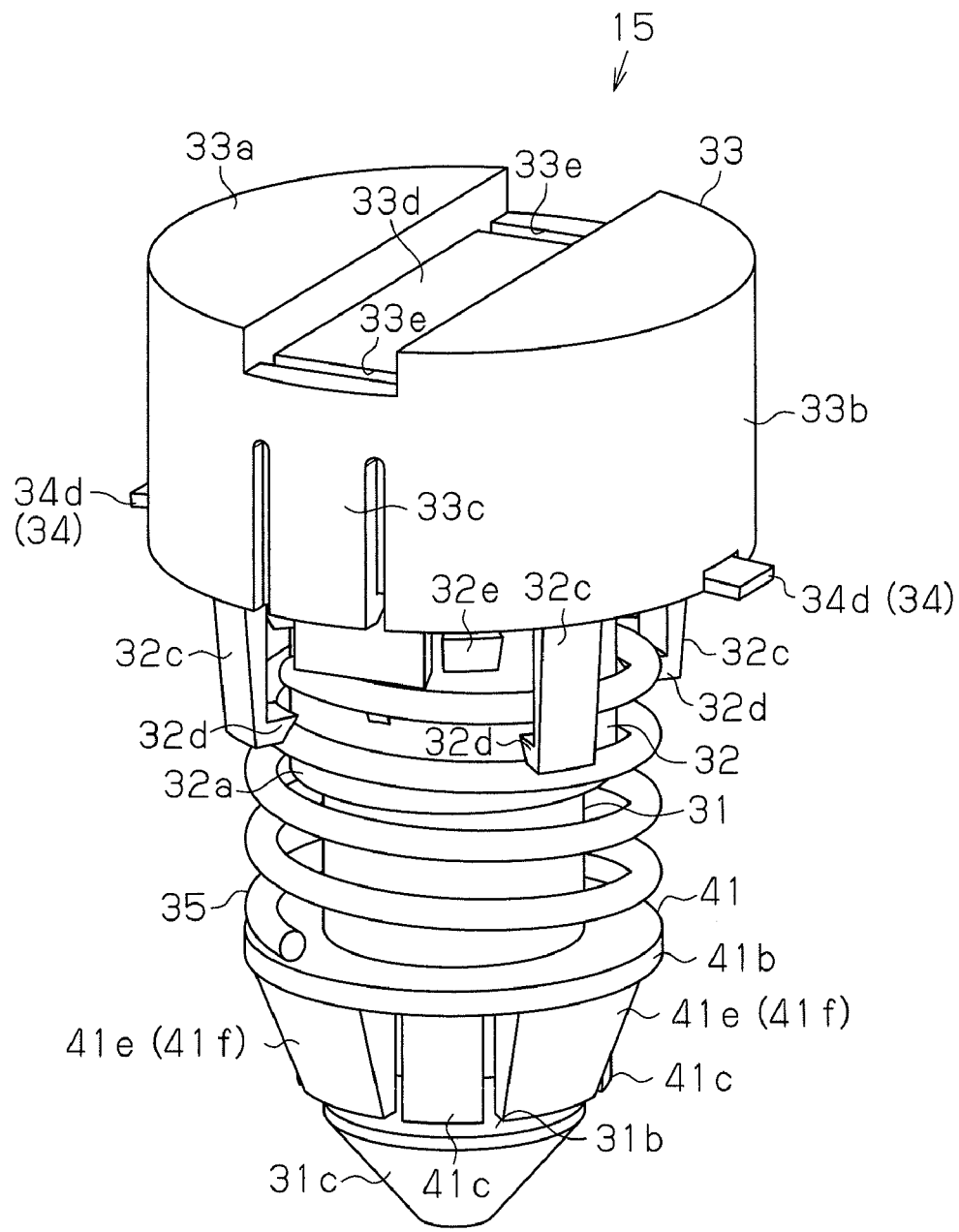
FIG. 6 is a perspective view showing a horn switch mechanism.
Figure 7:
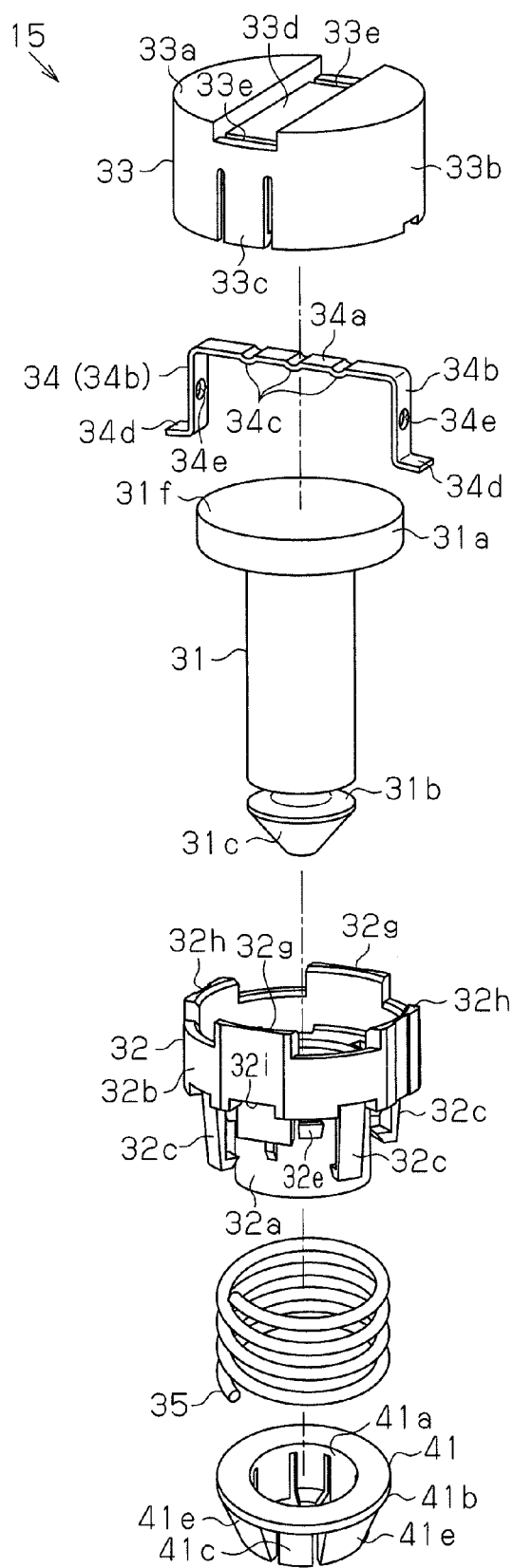
FIG. 7 is an exploded perspective view showing the horn switch mechanism.

As illustrated in FIGS. 6 and 7, each of the horn switch mechanisms 15 has a metal securing pin 31 serving as a support member, a movable attachment member 32 serving as an insulating portion, a resin cap member 33, a contact terminal 34 serving as a movable contact portion, a resin member 41, and a coil spring 35 serving as an urging member. The securing pin 31 extends substantially in the up-down direction, and has a circular transverse cross-sectional shape. A locking groove 31b serving as a recess is formed at the lower end of the securing pin 31 over the entire circumference of the securing pin 31. The outer diameter of the securing pin 31 except for the upper end is smaller than that of the attachment hole 21e of the bag holder 21. A head 31a having a lager diameter than the attachment hole 21e is formed at the upper end of the securing pin 31.

The movable attachment member 32 is formed of an insulating resin material. Each movable attachment member 32 is formed as a cylinder with a step. The movable attachment member 32 is joined to the securing pin 31 in a manner movable along the longitudinal direction of the securing pin 31. The movable attachment member 32 has a tubular portion 32a and a fitting portion 32b formed at the upper end of the tubular portion 32a. The securing pin 31 is inserted through the tubular portion 32a, and the head 31a of the securing pin 31 is engaged with the fitting portion 32b. The fitting portion 32b contacts the lower surface and the outer circumferential surface of the head 31a of the securing pin 31. A pair of abutting projections 32g projecting upward are formed at the upper end of the fitting portion 32b at opposite positions. A pair of holding projections 32h projecting upward are formed at the upper end of the fitting portion 32b at positions between the abutting projections 32g.

The fitting portion 32b has a plurality of spring holding portions 32c extending downward. The embodiment shown in FIGS. 6 and 7 has three spring holding portions 32c. A clearance is provided between the spring holding portions 32c and the tubular portion 32a. The spring holding portions 32c flex in a direction perpendicular to the axis of the horn switch mechanism 15 (radial direction). A locking projection 32d, which projects toward the tubular portion 32a, is formed at the lower end of each spring holding portion 32c.

Before the resin member 41 is attached to the securing pin 31, the spring holding portions 32c hold the coil spring 35 to the movable attachment member 32. The upper end of the coil spring 35 is inserted into a space between the tubular portion 32a of the movable attachment member 32 and the spring holding portions 32c to be locked to the locking projections 32d of the spring holding portions 32c, so that the spring 35 is held by the movable attachment member 32.

Figure 10:
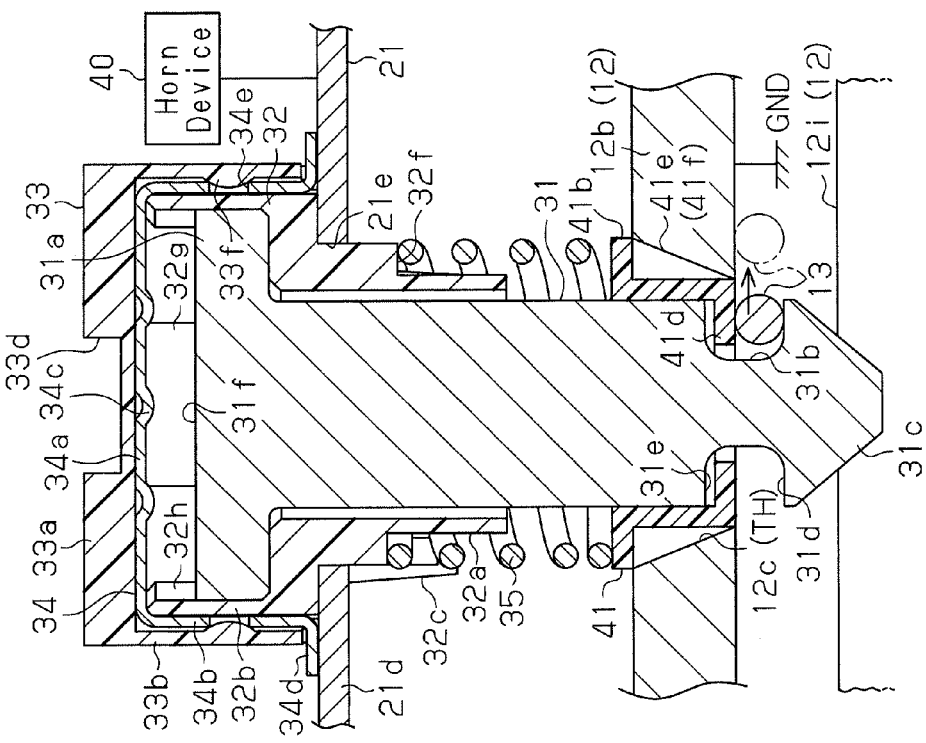
FIG. 10 is a cross-sectional view illustrating a state in which a securing pin is inserted into a normal through hole.

A plurality of holder locking portions 32e, which extend substantially downward, are formed on the lower surface of the fitting portion 32b. FIGS. 6 and 7 show one of the holder locking portions 32e. The holder locking portions 32e are arranged slightly offset from the spring holding portions 32c in the circumferential direction. As shown in FIG. 10, a clearance is provided between the holder locking portions 32e and the tubular portion 32a. Like the spring holding portions 32c, the holder locking portions 32e flex in the radial direction.

The cap member 33 is shaped like a cylinder with a bottom. The cap member 33 is joined to the fitting portion 32b of the movable attachment member 32 in such a manner as to cover the securing pin 31 and the movable attachment member 32 substantially from above. The cap member 33 has a circular upper portion 33a and a substantially cylindrical side wall portion 33b. The side wall portion 33b extends substantially downward from the periphery of the upper portion 33a. A pair of hook portions 33c are formed on the side wall portion 33b at opposite positions. The hook portions 33c are locked to a lower surface 32i of the fitting portion 32b. The upper portion 33a contacts the upper ends of the abutting projections 32g. This immovably attaches the cap member 33 to the movable attachment member 32.

A groove 33d is formed in an upper surface of the upper portion 33a. The groove 33d is used for adjusting the orientation of the cap member 33 when the cap member 33 is installed in the securing pin 31 and the movable attachment member 32. Molding holes 33e are formed in the groove 33d at the positions corresponding to the hook portions 33c. The molding holes 33e are used for molding the undercut portions of the hook portions 33c. The molding holes 33e are closed by the abutting projections 32g of the movable attachment member 32. This prevents foreign matter from entering the interior of the cap member 33 through the molding holes 33e. As a result, problems are prevented from occurring in electrical conduction between the securing pin 31 and the contact terminal 34.

The contact terminal 34 is arranged inside the cap member 33. The contact terminal 34 is formed by pressing a metal plate. The contact terminal 34 is formed by an elongated upper portion 34a and a pair of side portions 34b extending substantially downward from the ends of the upper portion 34a. The contact terminal 34 has a substantially U shaped cross section corresponding to the shape of the inner surface of the cap member 33. The contact terminal 34 is arranged in such a manner that the upper portion 34a extends perpendicular to the axis of the horn switch mechanism 15. Each side portion 34b is located outside one of the holding projections 32h of the movable attachment member 32 and held between the holding projection 32h and the cap member 33. An engagement hole 34e is formed in each of the side portions 34b. Engagement projections 33f, which project from the inner surface of the cap member 33, are locked to the corresponding engagement holes 34e. This holds the contact terminal 34 with respect to the inner surface of the cap member 33.

Three contact protrusions 34c, which project toward the securing pin 31, are formed in the upper portion 34a of the contact terminal 34. The contact protrusions 34c are arranged at equal intervals along the longitudinal direction of the upper portion 34a. The center one of the three contact protrusions 34c is located at the center in the longitudinal direction of the upper portion 34a. It is preferred that the three contact protrusions 34c be aligned in a radial direction of the steering wheel 10, so as to ensure the electrical conduction between the contact terminal 34 and the upper end face 31f of the securing pin 31.

Each side portion 34b has a bent portion 34d at the lower end. Each bent portion 34d is bent in such a manner as to extend outward. Before the horn switch mechanism 15 is joined to the bag holder 21, the angle defined by each bent portion 34d and the associated side portion 34b is greater than 90 degrees (95 degrees in the present embodiment), so that the bent portion 34d reliably contacts the upper surface of the bag holder 21 when the contact terminal 34 is attached to the bag holder 21. When the contact terminal 34 is installed in the bag holder 21, the angle defined by each bent portion 34d and the corresponding side portion 34b is substantially 90 degrees. The fitting portion 32b of the movable attachment member 32 is arranged between each side portion 34b and the securing pin 31. This ensures insulation between the side portions 34b and the securing pin 31.

Figure 8:
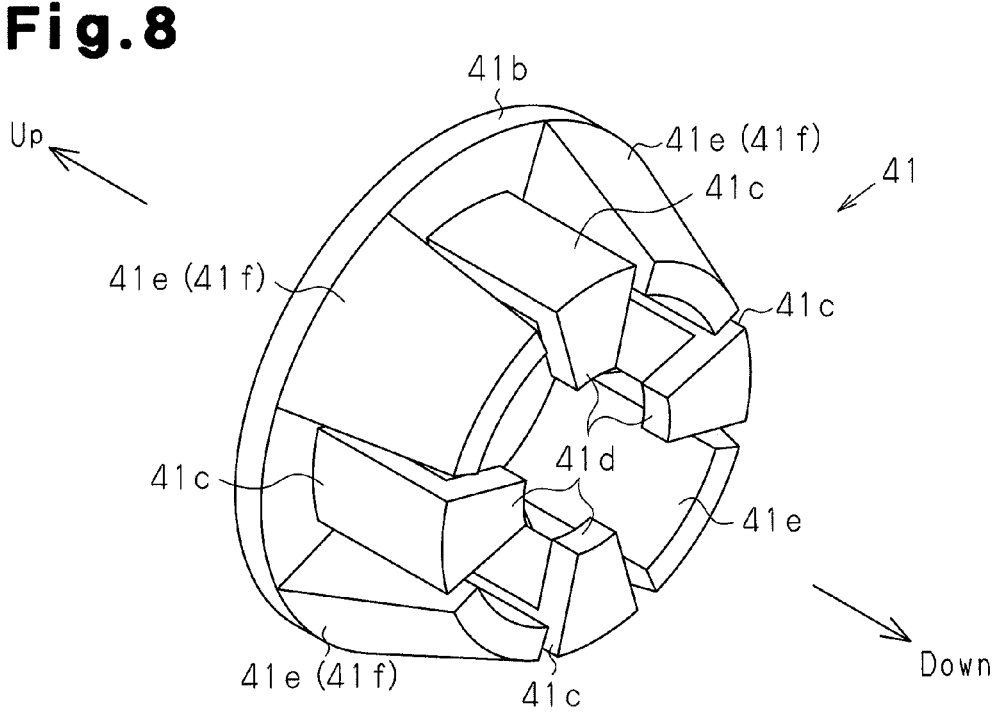
FIG. 8 is a perspective view of a resin member.

As shown in FIGS. 8 and 13, the resin member 41 is formed by an insulating synthetic resin. The resin member 41 includes an annular portion 41b having an insertion hole 41a. The outer diameter of the annular portion 41b is approximately equal to the outer diameter of the coil spring 35 and the outer diameter (maximum diameter) of the through hole TH at the upper end. The annular portion 41b of the resin member 41 is fitted about the outer circumference of the securing pin 31.

A plurality of locking pieces 41c extending substantially downward are provided on the lower surface of the annular portion 41b. The locking pieces 41c are arranged about the insertion hole 41a at equal angular intervals (90°). Each locking piece 41c has at its lower end a claw portion 41d projecting inward. The claw portions 41d enter the locking groove 31b of the securing pin 31. The outer surface of each locking piece 41c forms a part of a circumferential surface. Therefore, there is no plane-to-plane contact between the outer surface of each locking piece 41c and a tapered wall surface 12d of the insertion hole 12c.

Four engaging pieces 41e extending substantially downward are formed on the lower surface of the annular portion 41b. Each engaging piece 41e is located between an adjacent pair of the locking pieces 41c. The outer side surface 41f of each engaging piece 41e forms a part of a tapered surface that widens toward the upper end. The resin member 41 is formed by the annular portion 41b, the locking pieces 41c and the engaging pieces 41e. The resin member 41 is attached to the securing pin 31 by fitting the securing pin 31 into the annular portion 41b of the resin member 41 and causing the claw portions 41d to enter the locking groove 31b. The outer side surfaces 41f of the four engaging pieces 41e are intermittently provided about the axis of the annular portion 41b with the four locking pieces 41c located therebetween. The resin member 41 as a whole has a tapered surface that widens toward the upper end.

Figure 11:
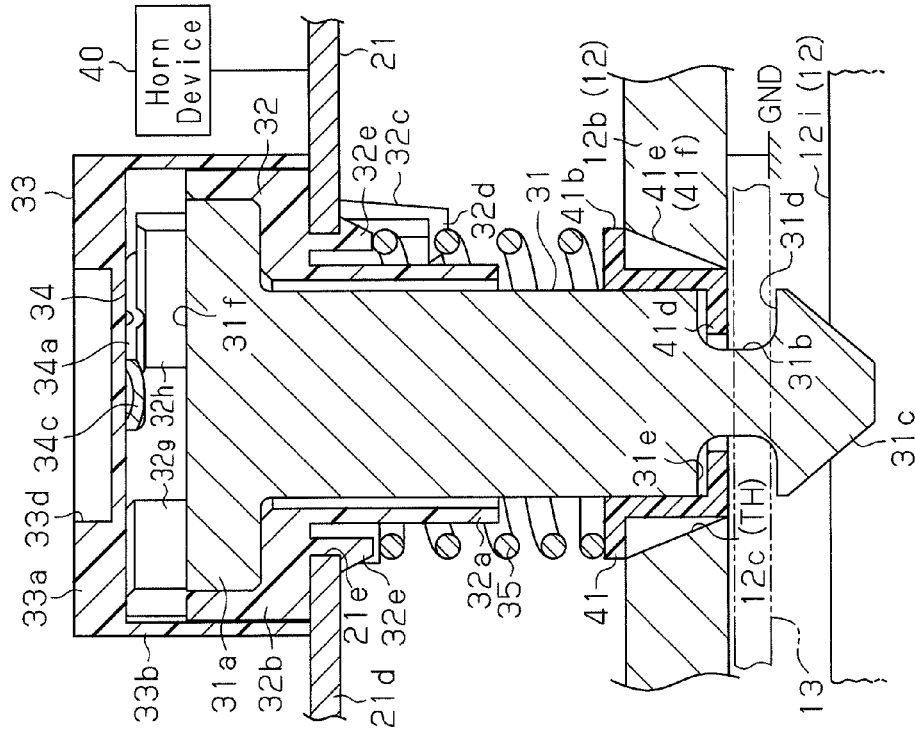
FIG. 11 is a cross-sectional view illustrating the inner structure of the horn switch mechanism.

As shown in FIGS. 6 and 11, the coil spring 35 is wound about the securing pin 31. The coil spring 35 is arranged while being compressed between the step 32f of the movable attachment member 32 and the annular portion 41b of the resin member 41. In this state, the annular portion 41b functions as a second pressure receiving portion that receives the downward urging force of the compressed coil spring 35. In this manner, the securing pin 31, the movable attachment member 32, the cap member 33, the contact terminal 34, the coil spring 35, and the resin member 41 are unitized. Accordingly, when the horn switch mechanism 15 is installed or replaced, the horn switch mechanism 15 can be handled as an integral assembly.

As shown in FIGS. 10 to 12, each unitized horn switch mechanism 15 is inserted through the corresponding attachment hole 21e of the bag holder 21 and fixed. The attachment holes 21e is formed in the attachment portions 21d of the bag holder 21. Thus, all the horn switch mechanisms 15 project downward from the bag holder 21 when attached to the bag holder 21. FIG. 10 shows a cross section of one of the horn switch mechanisms 15 including the holder locking portions 32e, and FIGS. 11 and 12 show cross sections of the horn switch mechanism 15 including the upper portion 34a, the side portions 34b and the bent portions 34d. The recesses 21i are arranged about the attachment hole 21e at equal angular intervals. The recesses 21i are used for determining the position of the movable attachment member 32 inserted through the attachment hole 21e in the circumferential direction. The recesses 21i receive the spring holding portions 32c of the movable attachment member 32.

When the movable attachment member 32 is inserted into the attachment hole 21e, the bent portions 34d of the contact terminal 34 contact the upper surface of the bag holder 21. As the movable attachment member 32 is continuously inserted into the attachment hole 21e, the angle defined by the bent portions 34d and the side portions 34b becomes smaller. When the angle is 90 degrees, the contact area of each bent portion 34*d* with the upper surface of the bag holder 21 is maximized. This reliably permits conduction between the bag holder 21 and the contact terminal 34. When the lower end of the holder locking portion 32*e* surpasses the attachment hole 21*e* as the movable attachment member 32 inserted into the attachment hole 21*e*, the holder locking portion 32*e* is locked to the lower surface of the bag holder 21. This locking structure is referred to as snap-fit structure.

The upper surface of the bag holder 21 contacts the lower end of the side wall portion 33*b* of the cap member 33 and the lower ends of the hook portions 33*c* of the cap member 33. Each holder locking portion 32*e* of the movable attachment member 32 and the cap member 33 hold the bag holder 21 in between, so that the movable attachment member 32, the cap member 33, and the contact terminal 34 are movable with the bag holder 21 in the up-down direction. Also, the movable attachment member 32, the cap member 33, and the contact terminal 34 are movable relative to the securing pin 31.

With each horn switch mechanism 15 attached to the bag holder 21, the upper end of the securing pin 31 (the head 31*a*) is located at a position higher than the bag holder 21. The head 31*a* forms a pressure receiving portion that receives urging force of the coil spring 35 substantially from below. In this state, the movable attachment member 32 is located between the securing pin 31 and the bag holder 21. Therefore, the securing pin 31 and the bag holder 21 are prevented from contacting each other and maintained insulated from each other. The bag holder 21 is supported by the securing pin 31 so as to be movable in the up-down direction, and the upward urging force of the coil spring 35 is transmitted to the head 31*a* of the securing pin 31.

In the above described attached state, the upper surface of the cap member 33 contacts the corresponding switch support portion 24*g* of the pad portion 24. This prevents the cap member 33 from coming off the movable attachment member 32 by the reaction force when the airbag device 20 is struck hard. Further, the coil spring 35 of each horn switch mechanism 15 and the securing pin 31 inserted into the coil spring 35 project substantially downward from the bag holder 21. The airbag device 20 is attached to the metal core 12 with the three horn switch mechanisms 15 in between. The airbag device 20 is attached to the metal core 12 by fastening the horn switch mechanisms 15, which are attached to the bag holder 21, to the metal core 12.

As shown in FIGS. 2, 9A, and 10, the normal through holes 12*c* are provided in the holding portions 12*b* on the left side and the right side of the boss portion 12*a*. Each normal through hole 12*c* is tapered such that its diameter decreases toward the lower end. The normal through holes 12*c* have a size that allows insertion of the resin member 41. Therefore, when the securing pin 31 and the wall surface of each normal through hole 12*c*, into which the resin member 41 is inserted, contact the resin member 41, inclination of the resin member 41 and the securing pin 31 is restricted. The inner diameter at the upper end of each normal through hole 12*c* is substantially the same as the outer diameter of the annular portion 41*b* of the resin member 41.

The clip 13 is arranged below each normal through hole 12*c*. The clip 13 is engaged with the locking groove 31*b* of the securing pin 31 in the normal through hole 12*c*. The clip 13 may be engaged with the locking groove 31*b* from any radial direction to the securing pin 31. The direction in which the clip 13 is engaged with the locking groove 31*b* is determined by the initial position of the clip 13, which is located substantially below the normal through hole 12*c*, or by the position of the clip 13 before being engaged with the locking groove 31*b*. The initial position of the clip 13, which is located substantially below the normal through hole 12*c*, is not particularly limited.

As shown in FIGS. 2, 9B, and 12, the special through hole 12*j* is provided in the holding portion 12*b* substantially below the boss portion 12*a*. At least a part of the special hole 12*j* is formed by a main portion 12*k*. The main portion 12*k* is tapered such that its diameter decreases toward the lower end. The main portion 12*k* has a size that allows insertion of the resin member 41 attached to the securing pin 31. Therefore, if the special through hole 12*j* is formed only by the main portion 12*k*, the wall surface of the special through hole 12*j* contacts the resin member 41. Thus, inclination of the resin member 41 and the securing pin 31 is restricted.

The special through hole 12*j* has an inclination permitting portion 12*l*, which is formed continuous to the main portion 12*k*. The inclination permitting portion 12*l* is located at a position opposite to the position at which the clip 13 is engaged with the locking groove 31*b*. The inclination permitting portion 12*l* extends from the main portion 12*k* to the inclination range of the securing pin 31, which is inclined about the clip 13 serving as a fulcrum. The inclination permitting portion 12*l* may communicate with or be disconnected from the outer portion of the holding portion 12*b*. Substantially below the special through hole 12*j*, the position at which the clip 13 is engaged with the locking groove 31*b* is located away from the normal through holes 12*c* (in a lower portion in FIG. 2, in a left portion in FIGS. 9B and 12). That is, the initial position of the clip 13 is further away from the normal through holes 12*c* than the main portion 12*k*.

The inclination permitting portion 12*l* is located at a position that is opposite to the position at which the clip 13 is engaged with the locking groove 31*b* with respect to the main portion 12*k*, and close to the normal through holes 12*c* (in an upper portion in FIG. 2, in a right portion in FIGS. 9B and 12). Thus, when the clip 13 is disengaged from the securing pin 31 in each normal through hole 12*c*, the securing pin 31 in the main portion 12*k* is permitted to be inclined upward about the clip 13 serving as a fulcrum.

Figure 14:
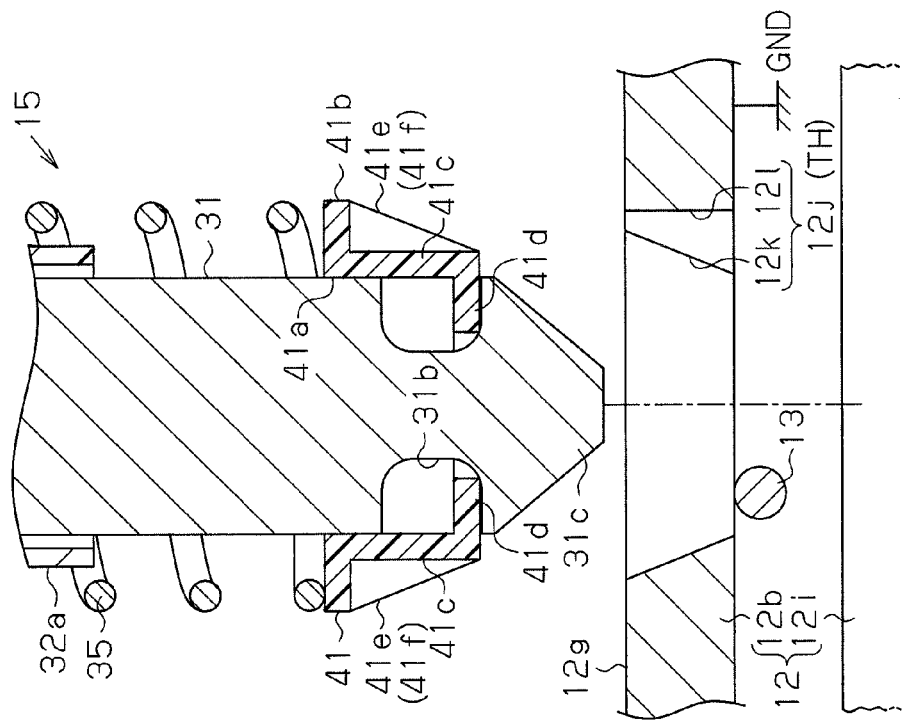
FIG. 14 is a cross-sectional view illustrating, the horn switch mechanism before being attached to the special through hole of the metal core.
Figure 16:
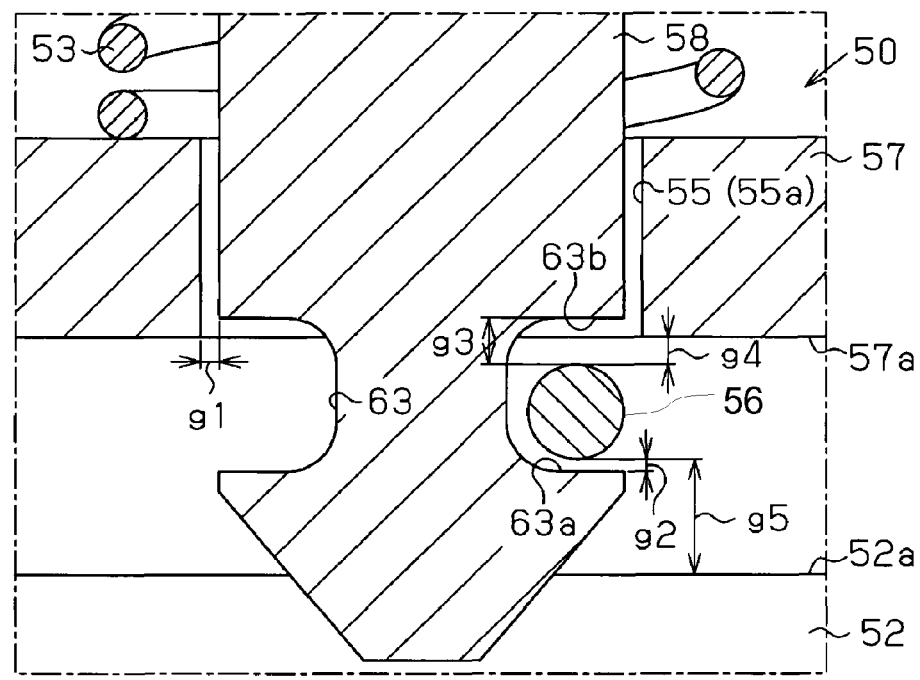
FIG. 16 is a partial cross-sectional view of prior art for explaining clearances, which are the cause of generation of noise.

When fastening the three horn switch mechanisms 15 attached to the bag holder 21 to the metal core 12, each securing pin 31 is brought closer to the corresponding through hole TH as shown in FIGS. 13 and 14. At this time, a portion of each securing pin 31 that is substantially below the locking groove 31*b* (hereinafter, referred to as a lower end 31*c*) projects downward from the coil spring 35 and the resin member 41. Thus, by fitting the lower end 31*c* of the securing pin 31 into the through hole TH, the securing pin 31 is easily positioned with respect to the through hole TH. The resin member 41 is attached to the securing pin 31 before being inserted into the through hole TH. Therefore, when inserting the securing pin 31 into the through hole TH, the resin member 41 is inserted into the through hole TH together with the securing pin 31.

Through the insertion, the annular portion 41*b* of the resin member 41 approaches the upper surface 12*g* of the holding portion 12*b*, and the engaging pieces 41*e* approaches the wall surface of the through hole TH. The lower end 31*c* of the securing pin 31 contacts the clip 13. When the securing pin 31 keeps being inserted against the urging force of the clip 13, the clip 13 is elastically deformed outward. As shown in FIGS. 11 and 12, when the securing pin 31 is inserted to a position where the locking groove 31*b* is at the same height as the clip 13, the clip 13 enters the locking groove 31*b* due to its elastic restoring force.

The claw portions 41*d* of the resin member 41, which are urged substantially downward by the coil spring 35, also enter the locking groove 31b. Therefore, in the process of entering the locking groove 31b, the clip 13 enters the space between the claw portions 41d and the lower surface 31d in the locking groove 31b while compressing the coil spring 35 upward. Accordingly, the claw portions 41d are held at a position higher than the clip 13 in the locking groove 31b. A portion of the clip 13 that is substantially below the through hole TH is sandwiched and held by the claw portions 41d urged substantially downward by the coil spring 35 and the lower surface 31d of the locking groove 31b. The securing pin 31 is held by the clip 13 in the locking groove 31b so as to be immovable in the up-down direction. In this manner, the securing pins 31 are locked to the metal core 12 by means of the clips 13, so that the horn switch mechanism 15 is fastened to the metal core 12. The airbag device 20 is thus attached to the metal core 12.

The structure by which the elasticity of the clip 13 is used to insert the securing pin 31 into the through hole TH of the metal core 12 and lock the securing pin 31 is also a snap-fit structure. In the process of locking, the resin member 41 is inserted into the through hole TH together with the securing pin 31, and is locked to the holding portion 12b of the metal core 12 by means of the clip 13. Thus, the resin members 41 do not need to be individually attached to the holding portions 12b of the metal core 12. Therefore, the resin member 41 is easily placed between the wall surface of the through hole TH and the securing pin 31.

With all the horn switch mechanisms 15 fastened to the metal core 12, the tapered resin members 41 are fitted in the tapered normal through holes 12c. This restricts the inclination of the securing pins 31 in the normal through holes 12c. On the other hand, ignoring the fastening of the securing pins 31 at the normal through holes 12c, the inclination permitting portion 12l permits the securing pin 31 in the special through hole 12j to be inclined.

However, the horn switch mechanisms 15 in the two normal through holes 12c and the switch mechanism 15 in the special through hole 12j are installed substantially on the same surface of the bag holder 21. The three horn switch mechanism 15 are coupled to each other by the common bag holder 21. The movement of the horn switch mechanism 15 in the special through hole 12j is influenced by the horn switch mechanisms 15 in the normal through holes 12c through the bag holder 21. If the horn switch mechanisms 15 in the normal through holes 12c do not move, the horn switch mechanism 15 in the special through hole 12j does not move, either.

Therefore, as long as inclination of a pair of the horn switch mechanisms 15 fastened to the normal through holes 12c is restricted, the bag holder 21 cannot be inclined relative to the metal core 12. If the bag holder 21 cannot be inclined, the inclination of the horn switch mechanism 15 fastened to the special hole 12j is restricted. The clips 13 keep being engaged to the locking grooves 31b of the three horn switch mechanisms 15 inserted in the normal through holes 12c and the special through hole 12j. The three horn switch mechanisms 15 keep being fastened to all the through holes TH of the metal core 12.

In the above described fastened state, the outer side surfaces 41f of the engaging pieces 41e contact the wall surface in each through hole TH. The claw portions 41d are slightly separated from the upper surface 31e in the locking groove 31b. In this manner, the resin member 41 is placed between the wall surface of each through hole TH of the metal core 12 and the securing pin 31. The securing pins 31 of the horn switch mechanism 15 locked to the metal core 12 support the bag holder 21 such that the bag holder 21 is movable relative to the metal core 12 through the movable attachment members 32, more specifically, such that the bag holder 21 can contact and separate from the metal core 12.

While being located between the step 32f of the corresponding movable attachment member 32 and the annular portion 41b of the corresponding resin member 41, each coil spring 35 is compressed by a greater degree than before being attached to the metal core 12. The compressed coil spring 35 urges the movable attachment member 32 substantially upward away from the metal core 12. That is, the coil spring 35 urges the movable attachment member 32 such that the contact terminal 34 is separated substantially upward from the upper end face 31f of the securing pin 31. By further compressing the coil spring 35, the airbag device 20 can be moved toward the metal core 12. Accordingly, the coil spring 35 is compressed while maintaining the horn stroke. The horn stroke refers to the amount by which the airbag device 20 is pressed down when moving the contact terminals 34 from a position away from the upper end faces 31f of the securing pins 31 (OFF position shown in FIGS. 11 and 12) to a position contacting the upper end faces 31f of the securing pins 31 (ON position shown in FIG. 15). The urging force of the coil springs 35 determines the horn load when the driver presses down the airbag device 20 to activate any of the horn switch mechanisms 15.

In a normal state where the airbag device 20 is not pressed down or the airbag device 20 is not receiving any excessive load, the contact terminals 34 are separated substantially upward from the upper end faces 31f of the securing pins 31, which are fixed contact portions. The contact terminals 34 and the securing pins 31 are in a non-conductive state, and the horn device 40 does not operate. At this time, in each securing pin 31 locked to the metal core 12 by the clip 13, the head 31a receives the upward urging force of the coil spring 35 through the movable attachment member 32 and the bag holder 21. Therefore, the securing pin 31 is supported at the upper part and the lower part, and movement of the securing pin 31 is restricted. Thus, in the metal core 12, noise caused by contact between the securing pins 31 and the wall surfaces of the through holes TH is suppressed.

Also, the downward urging force of each coil spring 35 is applied to the corresponding resin member 41 through the annular portion 41b. Accordingly, the claw portions 41d of the resin member 41 in the locking groove 31b of the securing pin 31 press the clip 13 in the locking groove 31b substantially downward. The pressing causes the clip 13 to be held between the lower surface 31d of the locking groove 31b and the claw portions 41d, which restricts the movement of the clip 13. Therefore, the clip 13 is prevented from contacting the lower surface 31d of the locking groove 31b. This suppresses noise. Since the movement of the clip 13 is restricted, parts of the clip 13 that are located outside the locking groove 31b are unlikely to move. Therefore, it is possible to reduce the noise generated when part of the clip 13 contacts the lower surface 12e of the holding portion 12b or the upper surface 12f of the metal core main body 12i.

In contrast, when the airbag device 20 is pressed down or receives an excessive load, and the bag holder 21 is moved downward against the coil springs 35, accordingly, the movable attachment member 32 of at least one of the horn switch mechanisms 15 is pressed together with the bag holder 21 against the urging force of the coil spring 35, so as to move substantially downward toward the metal core 12. The cap member 33 and the contact terminal 34 move toward the metal core 12 together with the bag holder 21 and the movable attachment member 32. Possible states in which an excessive load occurs include a state in which the airbag device 20 is greatly shaken when the vehicle is traveling on a rough road.

Figure 15:
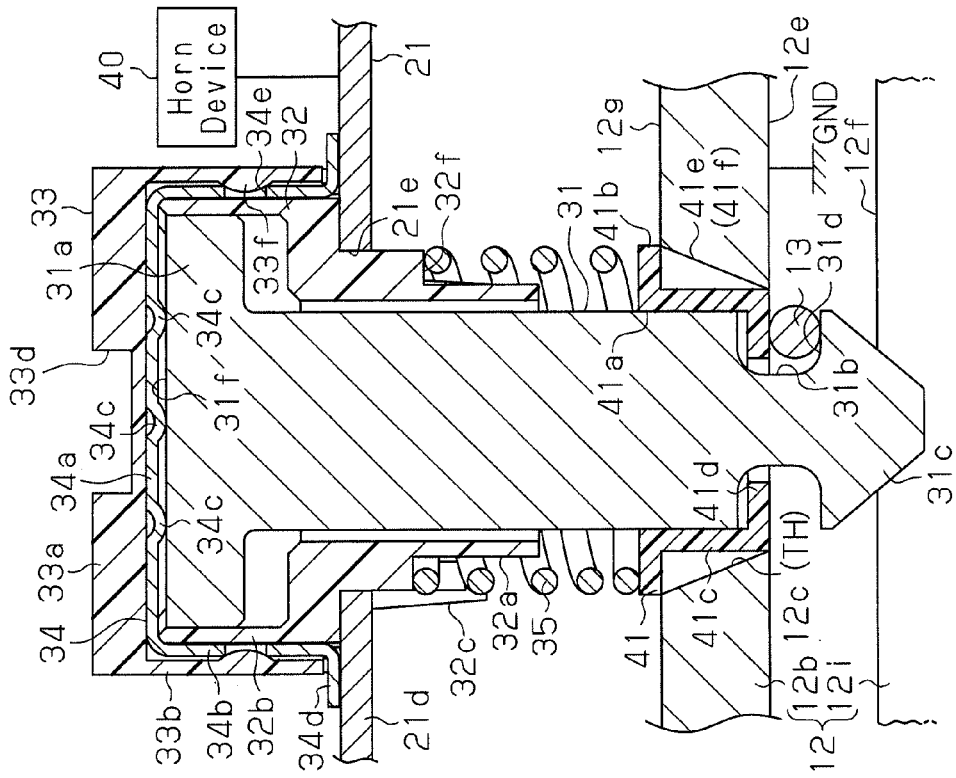
FIG. 15 is a partial cross-sectional view illustrating a state in which the airbag device is pressed down with the securing pin inserted in the normal through hole.

As shown in FIG. 15, when at least one of the three contact protrusions 34c contacts the upper end face 31f of the securing pin 31, the metal core 12, which is connected to the ground GND, and the bag holder 21 are conducted to each other through the securing pin 31 and the contact terminal 34. The conduction activates the horn device 40, which is electrically connected to the bag holder 21. In this manner, the securing pins 31 are locked to the metal core 12 (holding portions 12b) and support the bag holder 21 such that the bag holder 21 is movable substantially in the up-down direction relative to the metal core 12. The securing pins 31 also function as fixed contact portions. Accordingly, the horn plate disclosed in Patent Document is unnecessary.

When the bag holder 21 is moved substantially downward, the urging force of the coil springs 35, which has been applied to the heads 31a of the securing pins 31, disappears. Therefore, each securing pin 31 can swing about a position at which the securing pin 31 is locked to the metal core 12 by the clip 13 serving as a fulcrum. At this time, the upward urging force of the coil spring 35, which is applied to the lower surface 31d in the locking groove 31b, stops acting on the clip 13. This allows the clip 13 to move in the locking groove 31b.

If no resin member 41 is provided between the metal core 12 (holding portion 12b) and the securing pin 31, clearances are created at a position where the securing pin 31 is locked to the metal core 12. These clearances include the following (see FIG. 16).

(i) A clearance g1 between the wall surface 55a of the through hole 55 and the support member 58

(ii) A clearance g2 between the elastic member 56 and the lower surface 63a in the locking groove 63

(iii) A clearance g3 between the elastic member 56 and the upper surface 63b in the locking groove 63

(iv) A clearance g4 between the lower surface 57a of the holding portion 57 and the elastic member 56

(v) A clearance g5 between the elastic member 56 and the upper surface 52a in the metal core body 52

The clearance g1 allows the support member 58 to contact the wall surface 55a of the through hole 55 to generate noise. The clearance g2 allows the elastic member 56 to contact the lower surface 63a in the locking groove 63 to generate noise. The clearance g3 allows the elastic member 56 to contact the upper surface 63b in the locking groove 63 to generate noise. The clearance g4 allows the elastic member 56 to contact the lower surface 57a of the holding portion 57 to generate noise. The clearance g5 allows the elastic member 56 to contact the upper surface 52a of the core body 52 to generate noise. That is, if the support member 58 and the elastic member 56 are made of metal, and the core body 52 and the holding portion 57 are also made of metal, contact between metal components generates harsh noise.

These clearances allows the securing pin 31 serving as a support member and the clip 13 serving as an elastic member to move, so that the securing pin 31 and the clip 13 can generate noise by contacting surrounding components. In this respect, the resin member 41 is disposed between the wall surface 12d of the through hole 12c and the securing pin 31 in the present embodiment. Thus, despite the fact that the clearance g1 exists, the resin member 41 restricts contact between the securing pin 31 and the wall surface 12d of the through hole 12c. Because of the clearance between the securing pin 31 and the resin member 41, noise may be generated when the securing pin 31 contacts the resin member 41. However, such noise is suppressed to a level lower than noise generated by contact between the securing pin 31 and the wall surface 12d of the through hole 12c. Also, the noise is less harsh than noise generated by contact between metal components. The claw portions 41d of the resin member 41 are arranged in the locking groove 31b at positions above the clip 13. Thus, despite the fact that the clearance g3 exists, the claw portions 41d of the resin member 41 restrict contact between the upper surface 31e in the locking groove 31b and the clip 13. Further, the resin member 41 also restricts the movement of the clip 13 in the locking groove 31b. Since this restricts the movement of the clip 13 to the outside of the locking groove 31b, the clip 13 does not contact the lower surface 12e of the holding portion 12b or the upper surface 12f of the core main body 12i. That is, noise generated by contact between metal components is further suppressed.

When unfastening the horn switch mechanisms 15 from the metal core 12, tools T shown by alternate long and two short dashes lines in FIG. 2 are used. That is, the clip 13 located substantially below each normal through hole 12c is pressed, so as to move the clip 13 away from the locking groove 31b of the securing pin 31. Accordingly, as shown by alternate long and two short dashes lines in FIGS. 2 and 11, the clip 13 is elastically deformed and disengaged from the locking groove 31b. This unfastens the horn switch mechanism 15 from the metal core 12. At this time, the amount of deformation of the clip 13 is small. Therefore, the space for allowing the clip 13 to be elastically deformed does not need to be large. The unfastening unlocks the securing pin 31 from each normal through hole 12c. Thus, the securing pin 31, which receives the upward urging force of the coil spring 35, is pushed substantially upward and comes off the normal through hole 12c.

At this time, one securing pin 31 stays in the special through hole 12j, and the corresponding clip 13 is engaged with the locking groove 31b of the securing pin 31. All the horn switch mechanisms 15 are attached to substantially the same surface of the common bag holder 21. Thus, the movement of each horn switch mechanism 15 is restricted by the other horn switch mechanism 15 through the bag holder 21. Therefore, when any of the horn switch mechanisms 15 comes off the corresponding normal through hole 12c, the securing pin 31 is slightly inclined toward the special through hole 12j.

If each securing pin 31 has a constant cross-sectional shape along the axis of the corresponding normal through hole 12c, the securing pin 31 easily gets caught in the wall surface of the normal through hole 12c, which might restrict the upward movement. However, the normal through holes 12c are tapered such that they widen toward the upper end. The securing pin 31 is thus less likely to get caught in the wall surface of the normal through hole 12c.

Figure 17:
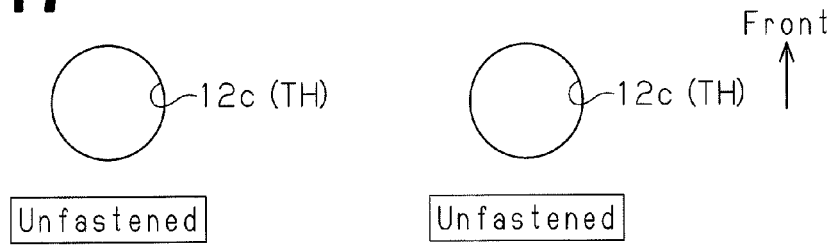
FIG. 17 is a diagram illustrating the positional relationship of two normal through holes, one special through hole, and a clip in the vicinity of the special through hole.

FIG. 17 shows the positional relationship between the two normal through holes 12c, the single special through hole 12j, and the clip 13 corresponding to the special through hole 12j. When the securing pins 31 are removed from the two normal through holes 12c, and the corresponding two horn switch mechanisms 15 are unfastened from the metal core 12, the securing pin 31 in the special through hole 12j can be inclined about the clip 13 serving as a fulcrum as shown by arrow of an broken line in FIG. 17. One of the reasons of this is that although inclination of the bag holder 21 is restricted when all the horn switch mechanisms 15 are attached, the bag holder 21 is permitted to be inclined by unfastening. Another reason is that the inclination permitting portion 12l extends to the inclination range of the securing pin 31, which is inclined about the clip 13 serving as a fulcrum.

Figure 18:
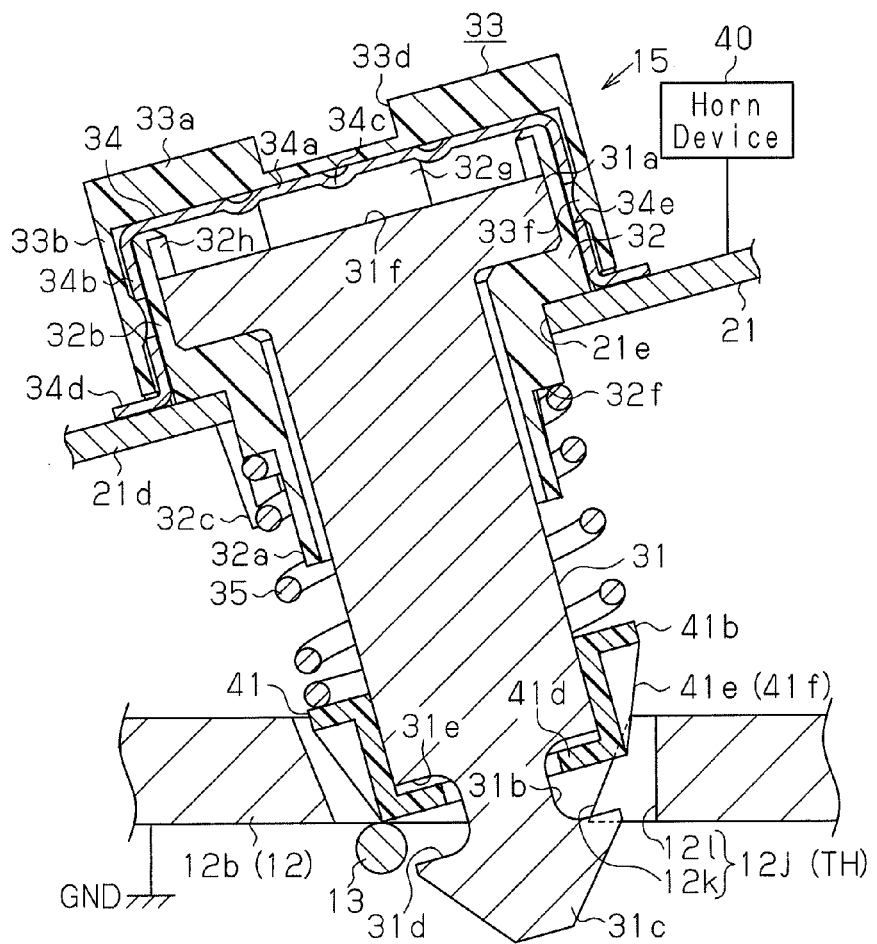
FIG. 18 is a cross-sectional view showing a state in which the securing pin is inclined about a clip serving as a fulcrum, in order to unfasten the horn switch mechanism fastened to the special through hole.

As shown in FIG. 18, the clip 13 deforms in conformity with the displacement of the locking groove 31b due to its own elastic restoring force. When the securing pin 31 keeps being inclined after the clip 13 reaches the initial position, the clip 13 stops deforming in conformity with the deformation of the locking groove 31b and starts separating from the locking groove 31b. Thus, unlike the securing pins 31 in the normal through holes 12c, the securing pin 31 in the special through hole 12j can disengage the locking groove 31b from the clip 13 without using any tool. When the clip 13 is removed form the locking groove 31b, the securing pin 31 is unfastened from the metal core 12.

At this time, when the securing pin 31 is inclined, the clip 13 contacts the wall surface of the special through hole 12j so that it is likely that the securing pin 31 cannot be inclined. In this respect, the resin member 41 is disposed between the wall surface of the special through hole 12j and the securing pin 31 in the present embodiment. This causes the resin member 41, which is more easily deformed than the metal core, not the wall surface of the special through hole 12j, to contact the clip 13. Thus, the resin member 41 that contacts the clip 13 is deformed, and the securing pin 31 is easily inclined, accordingly. When the horn switch mechanism 15 in the special through hole 12j is unfastened, the securing pin 31 is pushed substantially upward by the urging force of the coil spring 35 and comes off the normal through hole 12c.

At this time, the securing pin 31 is at least inclined in the special through hole 12j. Therefore, If the securing pin 31 has a constant cross-sectional shape along the axis of the special through hole 12j, the securing pin 31 easily gets caught in the wall surface of the special through hole 12j, which might restrict the upward movement. In this respect, the main portion 12k of the special through hole 12j is tapered to widen toward the upper end. The securing pin 31 is thus less likely to get caught in the wall surface of the special through hole 12j.

If the clip 13 is engaged with the locking groove 31b of the securing pin 31 in the special through hole 12j at a position near the normal through hole 12c, the securing pin 31 is inclined about the clip 13 serving as a fulcrum so that the once removed securing pin 31 enters the normal through hole 12c again. In this respect, when the securing pins 31 are removed from the normal through holes 12c, the securing pin 31 in the special through hole 12j can be inclined about the clip 13 located away from the normal through holes 12c serving as a fulcrum. At this time, the securing pin 31 in the special through hole 12j is inclined substantially upward in a direction for removing the securing pin 31 from the normal through hole 12c. Therefore, no measures need to be taken for preventing the securing pin 31 from entering the normal through hole 12c after being removed therefrom.

The securing pin 31 in the special through hole 12j is inclined when the horn switch mechanism 15 in any of the normal through holes 12c is unfastened. If the three horn switch mechanisms 15 can be independently displaced, the securing pin 31 in the special through hole 12j can be inclined without unfastening the horn switch mechanisms 15 in the normal through holes 12c. Thus, the clip 13 in the special through hole 12j may be disengaged from the locking groove 31b of the securing pin 31. In this respect, all the horn switch mechanisms 15 are attached substantially to the same surface of the bag holder 21 in the present embodiment. Therefore, each horn switch mechanism 15 cannot move independently from the other horn switch mechanism 15. That is, the securing pin 31 in the special through hole 12j cannot be inclined as long as the horn switch mechanisms 15 in the normal through holes 12c are fastened.

The present embodiment described above has the following advantages.

(1) The clip 13, which engages with the locking groove 31b of the securing pin 31, is provided in each through hole TH. Thus, compared to the configuration of Patent Document 2, in which a clip 13 corresponding to multiple through holes TH is formed by a single elastic wire, the space for arranging and allowing movement of the clips 13 is small.

(2) The through holes TH include the normal through holes 12c and the special through hole 12j. The normal through holes 12c restrict inclination of the securing pins 31. The special through hole 12j is formed by the main portion 12k and the inclination permitting portion 12l. In the present embodiment, by disengaging the clips 13 from the locking grooves 31b of the securing pins 31 in all the normal through holes 12c, the securing pin 31 in the special through hole 12j having the inclination permitting portion 12l is permitted to be inclined about the clip 13 serving as a fulcrum. Thus, the securing pin 31 in the special through hole 12j allows the clip 13 to be disengaged from the locking groove 31b without the tool T. This allows the horn switch mechanisms 15 to be easily unfastened from the metal core 12.

(3) All the horn switch mechanisms 15 are attached substantially to the same surface of the bag holder 21. Therefore, the securing pin 31 in the special through hole 12j cannot be inclined as long as the horn switch mechanisms 15 in the normal through holes 12c are fastened. Thus, each clip 13 is prevented from being accidentally removed from the locking groove 31b.

(4) Each securing pin 31 is locked to the metal core 12 by inserting the lower end of the securing pin 31 into the through hole TH of the metal core 12 and using the clip 13 of a snap-fit structure. In this case, since each securing pin 31 is inserted into the corresponding attachment hole 21e of the bag holder 21, the bag holder 21 is supported to the metal core 12 to be movable substantially in the up-down direction. Further, the upper end face 31f of the securing pin 31 is formed as a fixed contact portion. Each horn switch mechanism 15 includes the coil spring 35, which urges the bag holder 21 away from the metal core 12, and the contact terminal 34, which moves together with the bag holder 21. The contact terminal 34 contacts the upper end face 31f of the securing pin 31 so as to activate the horn device 40.

In a normal state, where the airbag device 20 is not pressed down or the airbag device 20 is not receiving any excessive load, the contact terminals 34 are separated substantially upward from the upper end faces 31f of the securing pins 31, so that the contact portions are in a non-conductive state. The horn device 40 therefore does not operate. In contrast, when the airbag device 20 is pressed down or receives an excessive load, the contact terminals 34 move substantially downward together with the bag holder 21, so that the contact portions are in a conductive state. This activates the horn device 40. In this manner, the securing pins 31 are locked to the metal core 12 and support the bag holder 21 such that the bag holder 21 is movable substantially in the up-down direction relative to the metal core 12. The securing pins 31 also function as fixed contact portions. Accordingly, the horn plate disclosed in Patent Document 1 is unnecessary. This reduces the number of components.

(5) Each securing pin 31 has at its upper end the head 31a, which receives the upward urging force of the coil spring 35. Thus, after the clip 13 in each normal through hole 12c is disengaged from the locking groove 31b, the urging force of the coil spring 35 pushes the securing pin 31 upward and off the normal through hole 12c. Also, after the clip 13 in the vicinity of the special through hole 12j is disengaged from the locking groove 31b, the urging force of the coil spring 35 pushes the securing pin 31 upward and off the special through hole 12*j*. This eliminates the necessity of the procedure for removing the unfastened securing pins 31 from the normal through holes 12*c* or the special through hole 12*j*.

(6) The special through hole 12*j* includes the main portion 12*k*, into which the securing pin 31 is inserted, and the inclination permitting portion 12*l*, which is formed continuous to the main portion 12*k*. At a side further away from the normal through holes 12*c*, the clip 13 is engaged with the locking groove 31*b* in the securing pin 31 in the main portion 12*k*. Thus, the securing pin 31 in the special through hole 12*j* is easy to incline substantially upward in a direction for removing the securing pin 31 from the normal through hole 12*c*. As a result, no measures need to be taken for preventing the securing pin 31 from entering the normal through hole 12*c* after being removed therefrom. The securing pins 31 are easily removed from the normal through holes 12*c* and the special through hole 12*j*.

(7) The inclination permitting portion 12*l* extends from the main portion 12*k* to the inclination range of the securing pin 31, which is inclined about the clip 13 serving as a fulcrum. Therefore, inclination of the securing pin 31 is not restricted in the inclination permitting portion 12*l*. The inclination permitting portion 12*l* corresponds to a space of the special through hole 12*j* that corresponds to the inclination range of the securing pin 31.

(8) Each normal through hole 12*c* is tapered such that its diameter decreases toward the lower end. Therefore, after the unfastening the horn switch mechanisms 15 in the normal through holes 12*c*, the securing pins 31 are easily removed from the normal through holes 12*c*. The main portion 12*k* of the special through hole 12*j* is also tapered such that its diameter decreases toward the lower end. Therefore, after the unfastening the horn switch mechanism 15 in the special through holes 12*j*, the securing pin 31 is easily removed from the special through hole 12*j*.

(9) The resin member 41 is disposed between the wall surface of the special through hole 12*j* and the securing pin 31. In this case, after the horn switch mechanism 15 is unfastened in the special through hole 12*j*, the resin member 41 contacts the clip 13 when the securing pin 31 is inclined. Since the resin member 41 is deformed by the contact with the clip 13, the securing pin 31 is easily inclined compared to the case where the clip 13 contacts the wall surface of the special through hole 12*j*. Also, the resin member 41 is also disposed between the wall surface 12*d* of each normal through hole 12*c* and the securing pin 31. In this case also, the resin member 41 restricts contact between the securing pin 31 and the wall surface 12*d* of the through hole 12*c*. Therefore, when the airbag device 20 is pressed down, noise is prevented from being generated at portions where the horn switch mechanisms 15 are locked to the metal core 12.

(10) With the resin member 41 attached to the securing pin 31, the securing pin 31 is inserted into the through hole 12*c* and locked to the metal core 12 by the clip 13. Thus, the resin members 41 do not need to be individually attached to the metal core 12. This allows the resin member 41 to be efficiently installed between the wall surface 12*d* of the through hole 12*c* and the securing pin 31.

(11) The claw portions 41*d* of the resin member 41 enter positions higher than the clip 13 in the locking groove 31*b*. In this case, the claw portions 41*d* prevent the clip 13 from contacting the upper surface 31*e* of the locking groove 31*b*. This prevents the generation of noise caused by contact between metal components.

(12) The upper end of the resin member 41 contacts the lower end of the coil spring 35, and has the annular portion 41*b* serving as a second pressure receiving portion, which receives the downward urging force of the coil spring 35. Accordingly, the clip 13 in the locking groove 31*b* is pushed downward by the claw portions 41*d*, so that the clip 13 is held between the lower surface 31*d* of the locking groove 31*b* and the claw portions 41*d*. As a result, the clip 13 is prevented from contacting the lower surface 31*d* of the locking groove 31*b*. This suppresses noise. For the same reason, it is possible to reduce the noise that is caused when the clip 13 contacts the lower surface 12*e* of the holding portion 12*b* or the upper surface 12*f* of the metal core main body 12*i*.

(13) The downward urging force of each coil spring 35 is applied to the corresponding resin member 41 through the annular portion 41*b*. If a configuration is employed in which the inner diameter of the through hole 12*c* is constant, the resin member 41 has no engaging pieces 41*e*, and the annular portion 41*b* contacts the upper surface 12*g* of the holding portion 12*b*, contacting portions of the resin member 41 and the holding portion 12*b* are limited to the lower surface of the annular portion 41*b*. In this case, the transmission area of the resin member 41 for transmitting the downward urging force of the coil spring 35 to the holding portion 12*b* is small, and the compression load might concentrate on the annular portion 41*b*. In this respect, the wall surface 12*d* of the through hole 12*c* according to the present invention is tapered to widen toward the upper end. Also, the outer side surface 41*f* of each engaging piece 41*e* of the resin member 41 is tapered to widen toward the upper end like the through hole 12*c*. Further, part of the resin member 41 that contacts the holding portion 12*b* consists of the outer side surfaces 41*f* of the four engaging pieces 41*e*. This enlarges the area of the contacting part compared to the case where only the lower surface of the annular portion 41*b* contacts the holding portion 12*b*. Accordingly, the transmission area of the resin member 41 for transmitting the urging force of the coil spring 35 to the holding portion 12*b* is enlarged. This reduces the intensity of the urging force acting per unit area and prevents the compression load from concentrating on a specific part of the resin member 41. Thus, even if the airbag device 20 is pushed down by a great force, the resin member 41 is not deformed or damaged.

The present invention may be embodied in the following forms.

<Modification to Horn Switch Mechanism 15>

The locking groove 31*b*, which the clip 13 enters, may be formed only in a part of the outer circumference of the securing pin 31. In this case, the locking groove 31*b* may be formed to have a constant depth along the circumferential surface of the securing pin 31 or may be flat.

In place of the securing pins 31, support members meeting the following conditions may be used.

Condition 1: the support member are each inserted into the through hole TH and locked to the metal core 12 by the clip 13.

Condition 2: the support members are inserted into and support the bag holder 21, such that the bag holder 21 is movable along the up-down direction relative to the metal core 12.

Condition 3: the support members each have a head 31*a* at apposition above the bag holder 21, which head 31*a* receives the upward urging force of the coil spring 35.

Condition 4: the support members are made of conductive metal and each have an upper end face 31*f* serving as a fixed contact portion.

The urging member is not limited to the coil spring 35 as long as it urges the bag holder 21 away from the metal core 12.

The elastic member may have a shape different from that of the clip 13.

A structure other than the snap-fit structure may be employed as a structure for securing the horn switch mechanisms 15 to the bag holder 21.

For example, an extension that extends from the tubular portion 32a may be formed in the movable attachment member 32, and a recess that corresponds to the extension may be formed in the attachment hole 21e of the bag holder 21. That is, after inserting the horn switch mechanism 15 into the attachment hole 21e while aligning the extension with the recess, the horn switch mechanism 15 may be rotated so that the extension is engaged with the lower surface of the bag holder 21.

<Modification to Metal Core 12>

As long as the metal core 12 has a portion that is located substantially below the airbag device 20, the metal core 12 may have a portion that is located at the same height as or above the airbag device 20.

<Modification to Through Holes TH and Clips 13>

The present invention may be applied to any type of airbag-equipped steering wheel 10, as long as it includes a metal core 12 having a plurality of through holes TH and a plurality of horn switch mechanism 15 located between the airbag device 20 and the metal core 12.

With reference FIGS. 19 to 22, first to fourth applications will be described. Each application preferably meets the following conditions.

Condition 1: at a side further away from the normal through holes 12c, the clip 13 is engaged with the locking groove 31b of the securing pin 31 in the main portion 12k.

This condition is employed for allowing all the securing pins 31 to be removed from the normal through holes 12c and the special through holes 12j without any measures for preventing the securing pins 31 from entering the normal through holes 12c after being removed therefrom. That is, the condition is employed for matching the direction in which the securing pin 31 is inclined about the clip 13 serving as a fulcrum with the upward direction along which the securing pin 31 is removed from the normal through hole 12c.

Condition 2: the inclination permitting portion 12l extends from the main portion 12k to the inclination range of the securing pin 31, which is inclined about the clip 13 serving as a fulcrum. This condition is employed for allowing the securing pin 31 to be inclined in the inclination permitting portion 12.

(First Application)

Figure 19:
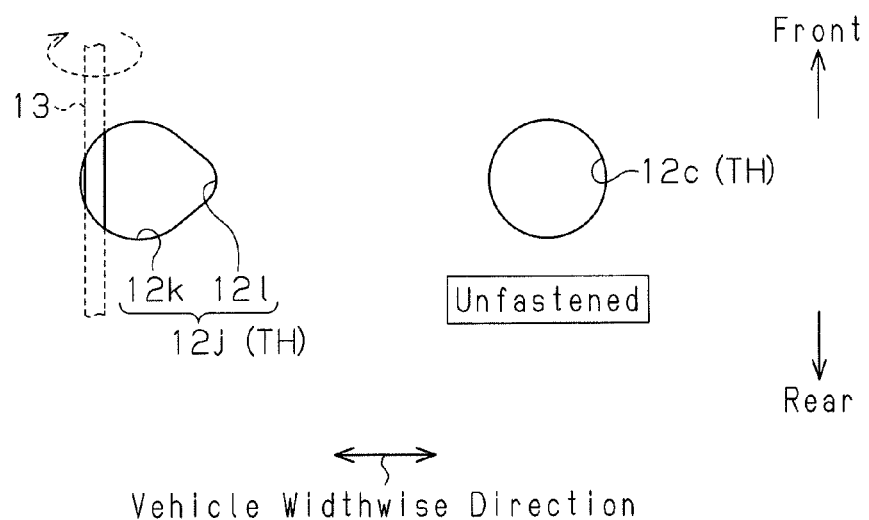
FIG. 19 is a diagram showing a first application, in which two through holes are formed in a metal core.

As shown in FIG. 19, two through holes TH are formed in the metal core 12. The through hole TH on the right is formed as a normal through hole 12c, and the through hole TH on the left is formed as a special through hole 12j. In this case, at a side further away from the normal through holes 12c, the clip 13 is engaged from the left with the locking groove 31b of the securing pin 31 in the special through hole 12j. The inclination permitting portion 12l of the special through hole 12j extends from the main portion 12k to the inclination range of the securing pin 31, which is inclined about the clip 13 serving as a fulcrum. Arrow of an broken line in FIG. 19 shows the direction of inclination of the securing pin 31. The same applies to FIGS. 20 to 22.

(Second Application)

Figure 20:
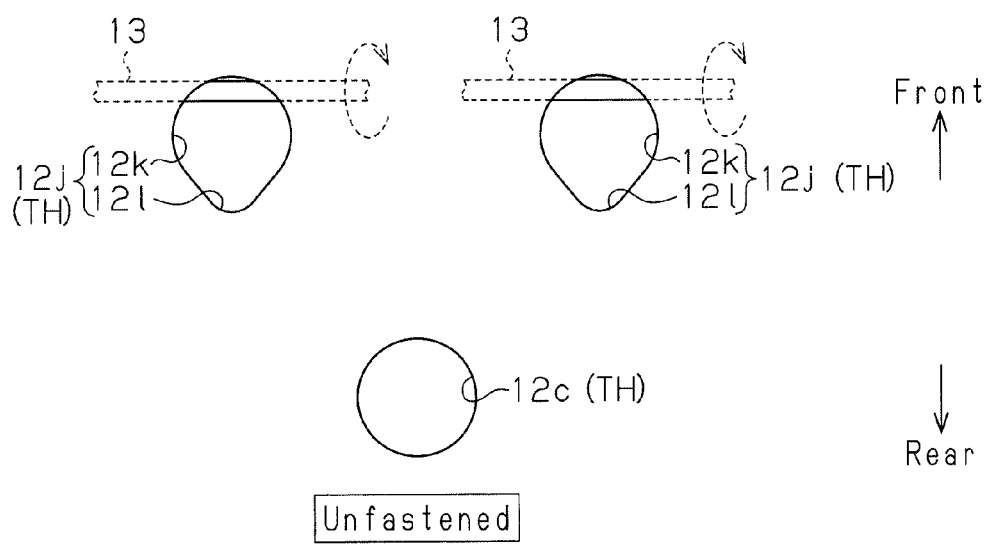
FIG. 20 is a diagram showing a second application, in which three through holes are formed in a metal core.

As shown in FIG. 20, three through holes TH are formed in the metal core 12. The rear through hole TH is formed as a normal through hole 12c, and the front two through holes TH are formed as special through holes 12j. In this case, at a side further away from the normal through hole 12c, the clips 13 are engaged from the front with the locking grooves 31b of the securing pins 31 in the special through holes 12j. The inclination permitting portion 12l of each special through hole 12j extends from the main portion 12k to the inclination range of the securing pin 31, which is inclined about the clip 13 serving as a fulcrum.

(Third Application)

Figure 21:
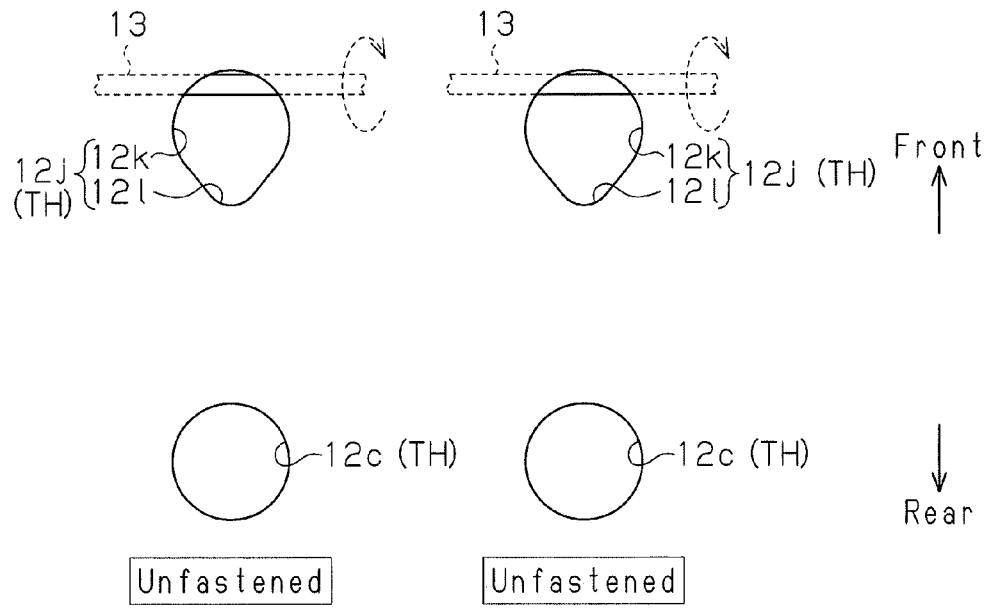
FIG. 21 is a diagram showing a third application, in which four through holes are formed in a metal core.

As shown in FIG. 21, four through holes TH are formed in the metal core 12. The rear two through holes TH are formed as normal through holes 12c, and the front two through holes TH are formed as special through holes 12j. In this case, at a side further away from the normal through hole 12c, the clips 13 are engaged from the front with the locking grooves 31b of the securing pins 31 in the special through holes 12j. Also, the inclination permitting portion 12l of each special through hole 12j extends from the main portion 12k to the inclination range of the securing pin 31, which is inclined about the clip 13 serving as a fulcrum.

(Fourth Application)

Figure 22:
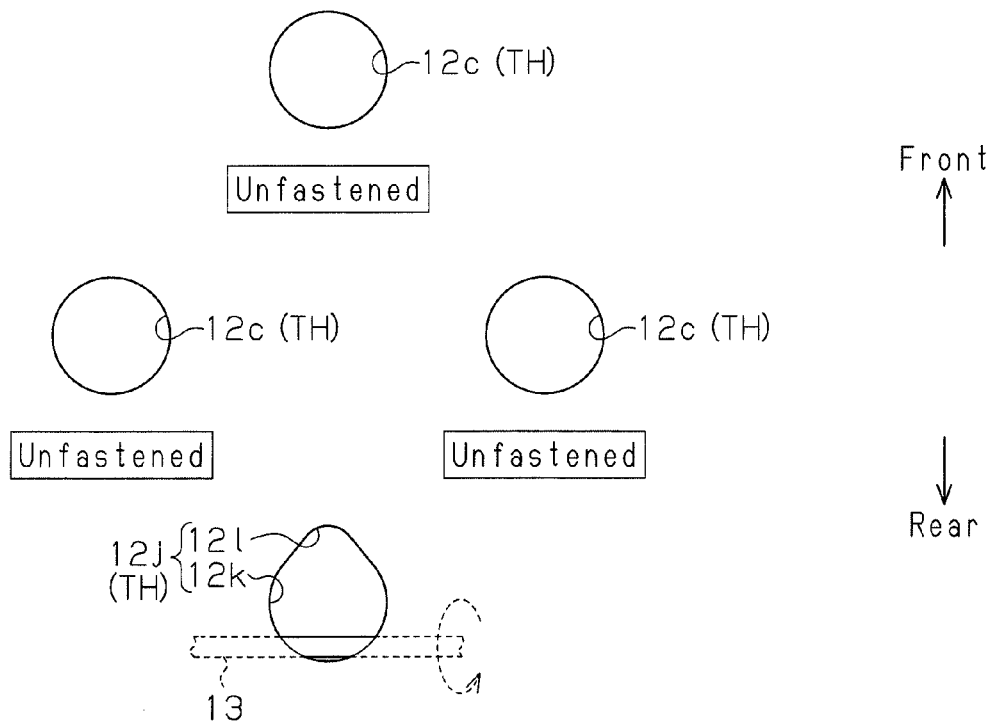
FIG. 22 is a diagram showing a fourth application, in which four through holes are formed in a metal core.

As shown in FIG. 22, four through holes TH are formed in the metal core 12. The front through hole TH and the through holes TH in a middle portion are formed as normal through holes 12c, and the rear through hole TH is formed as a special through hole 12j. In this case, at a side further away from the normal through holes 12c, the clip 13 is engaged from the rear with the locking groove 31b of the securing pin 31 in the special through hole 12j. Also, the inclination permitting portion 12l of the special through hole 12j extends from the main portion 12k to the inclination range of the securing pin 31, which is inclined about the clip 13 serving as a fulcrum.

The through holes TH may be located in positions other than those in the first to fourth applications. The metal core 12 may have five or more through holes TH. Further, normal through holes 12c and special through holes 12j may be employed in a manner different from those in the first to fourth applications.

The clip 13 is preferably engaged with the locking groove 31b of the securing pin 31 in the main portion 12k at a side further away from the normal through holes 12c. However, in each normal through hole 12c, the clip 13 may be engaged with the locking groove 31b of the securing pin 31 from any direction.

The normal through holes 12c and the special through holes 12j do not need to have a diameter that decreases toward the lower end. The normal through holes 12c and the special through holes 12j each may be a hole having a constant inner diameter at any part along the axial direction.

<Modification to Resin Member 41>

The entire outer side surface of the resin member 41 may be tapered such that it widens toward the upper end and establishes plane-to-plane contact with the wall surface of the through hole TH. For example, both of the outer side surface of each locking piece 41c and the outer side surface 41f of each engaging piece 41e may be tapered. In this case, the entire outer side surface of the resin member 41 establishes plane-to-plane contact with the wall surface 12d of the through hole 12c.

In view of removing the horn switch mechanisms 15 fastened to the metal core 12 while reducing the spaces for arranging clips, the resin members 41 may be omitted.

Figure 23:
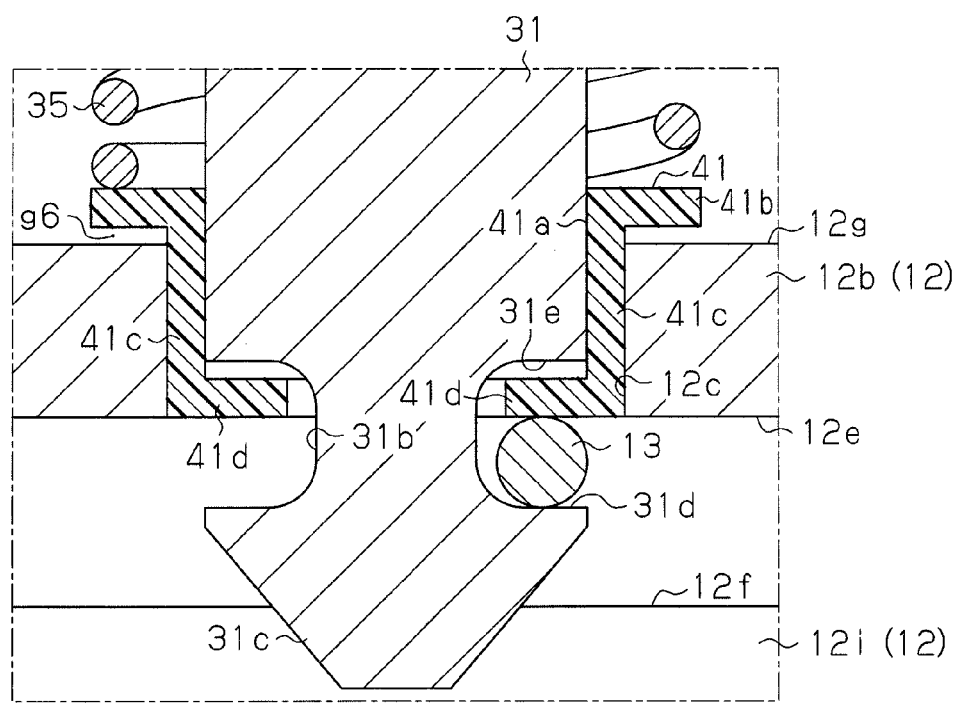
FIG. 23 is a partial cross-sectional view illustrating a resin member according to another embodiment.
Figure 24:
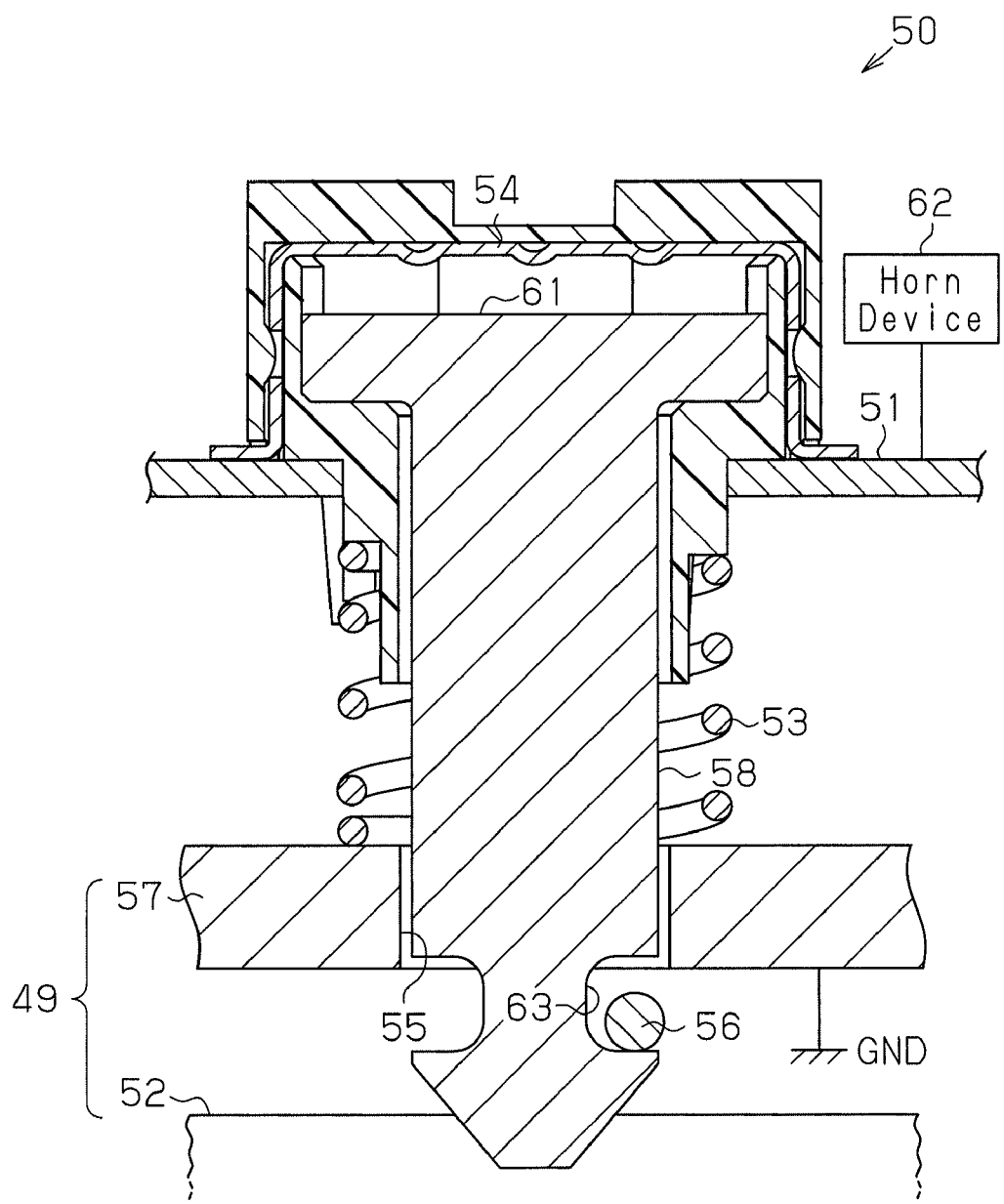
FIG. 24 is a cross-sectional view illustrating a state in which a horn switch mechanism is fastened to a metal core in a prior art airbag-equipped steering wheel.

If the downward urging force applied by the coil spring 35 is not great, the engaging pieces 41e having a tapered outer side surface 41f may be omitted as shown in FIG. 23. Accordingly, the inner diameter of the through hole 12c is made constant at a given part in the axial direction. In this case, the following condition is preferably met so that the clip 13 is pressed against the lower surface 31d of the locking groove 31b by the claw portions 41d.

Condition: in the process of inserting the securing pin 31 into the through hole 12c, the annular portion 41b does not contact the upper surface 12g of the holding portion 12b before the clip 13 is held between the claw portions 41d and the lower surface 31d of the locking groove 31b.

This is because if the annular portion 41b contacts the upper surface 12g of the holding portion 12b before the clip 13 is held between the claw portions 41d and the lower surface 31d of the locking groove 31b, the clip 13 cannot contact and be held between both of the claw portions 41d and the lower surface 31d. As shown in FIG. 23, a clearance g6 exists between the annular portion 41b and the upper surface 12g of the holding portion 12b in a state where the clip 13 is held between the claw portions 41d and the lower surface 31d in the locking groove 31b.

The annular portion 41b of the resin member 41 may be omitted. In this case, the downward urging force of the coil spring 35 is received by the holding portion 12b. In this case also, the resin member 41 restricts contact between the securing pin 31 and the wall surface 12d of the through hole 12c. Since the downward urging force of the spring 35 is not applied to the resin member 41 in this case, the claw portions 41d cannot press the clip 13 against the lower surface 31d in the locking groove 31b. However, since the claw portions 41d are located between the clip 13 and the upper surface 31e in the locking groove 31b, the clip 13 is prevented from contacting the upper surface 31e of the locking groove 31b.

Since the claw portions 41d of the resin member 41 are not located in the locking groove 31b, the noise generated when the resin member 41 contacts the wall surface of the locking groove 31b or the clip 13 is lower and less disturbing than the noise generated when the clip 13 contacts the wall surface of the locking groove 31b.

<Modification to Airbag Device 20>

The locking hole 21b and the attachment holes 21e of the bag holder 21, to which the pad portion 24 and the horn switch mechanisms 15 are attached, may be replaced by structures other than holes, for example, by projections. The positions of the locking holes 21b and the attachment holes 21e may be changed. The switch support portions 24g of the pad portion 24 may be provided inside of the storing wall portion 24b. In this case, the size of the airbag device can be reduced. Also, the switch support portions 24g may be formed to straddle the inside and the outside of the storing wall portion 24b.

<Other Modification>

Besides passenger vehicles, the present invention may be applied to industrial vehicles of various types. Further, the present invention may be applied vehicles such as aircraft and vessels.

The invention claimed is:

1. An airbag-equipped steering wheel comprising an airbag device and a metal core, the airbag device having a pad portion, an airbag, an inflator and a bag holder, and being configured by assembling the pad portion, the airbag, and the inflator to the bag holder, the airbag device being attached to the metal core via horn switch mechanisms activating a horn device,
wherein each horn switch mechanism includes:
a coil spring that urges substantially upwardly the bag holder away from the metal core;
a movable contact portion that moves together with the bag holder;
an elastic member located below a through hole formed in the metal core;
a support member inserted in the through hole and made of metal, the support member being engaged with the metal core via the elastic member and passing through the bag holder so that the bag holder is supported to move substantially in an up-down direction with respect to the metal core, the support member having a pressure receiving portion above the bag holder, the pressure receiving portion receiving an upward urging force of the coil spring, and a fixed contact portion being provided at an upper end surface of the support member; and
a resin member disposed between a wall surface of the through hole and the support member, the resin member includes an annular portion that functions as a pressure receiving portion, the pressure receiving portion of the resin member arranged to receive a downward urging force due to the coil spring,
wherein the horn device activates by moving the movable contact portion downward together with the bag holder to bring the movable contact portion into contact with the fixed contact portion to be in a conductive state.

2. The airbag-equipped steering wheel according to claim 1,
wherein the support member is locked to the metal core by the elastic member with the resin member attached to the support member and the support member inserted into the through hole.

3. The airbag-equipped steering wheel according to claim 1,
wherein, the elastic member is made of metal, wherein the support member has an outer side surface provided with a recess, and wherein a part of the elastic member and a part of the resin member enter the recess.

4. The airbag-equipped steering wheel according to claim 3,
wherein, the resin member enters a position higher than the elastic member in the recess and has a second pressure receiving portion, and wherein the second pressure receiving portion contacts the coil spring and receives a downward urging force of the coil spring.

5. The airbag-equipped steering wheel according to claim 4,
wherein the through hole has a tapered wall surface that widens toward an upper end of the tapered wall surface, and the resin member has a tapered outer side surface that widens toward an upper end of the resin member, and wherein the wall surface of the through hole contacts the outer side surface of the resin member.

* * * * *